(12) United States Patent
Kitagawa et al.

(10) Patent No.: US 10,650,762 B2
(45) Date of Patent: May 12, 2020

(54) DISPLAY DEVICE

(71) Applicant: Sharp Kabushiki Kaisha, Sakai, Osaka (JP)

(72) Inventors: Makoto Kitagawa, Sakai (JP); Hideki Fujimoto, Sakai (JP); Yusuke Nishihara, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/373,670

(22) Filed: Apr. 3, 2019

(65) Prior Publication Data

US 2019/0311688 A1  Oct. 10, 2019

(30) Foreign Application Priority Data

Apr. 5, 2018  (JP) .................................. 2018-072993

(51) Int. Cl.
*G09G 5/02* (2006.01)
*G09G 3/36* (2006.01)

(52) U.S. Cl.
CPC ... *G09G 3/3622* (2013.01); *G09G 2320/0247* (2013.01); *G09G 2320/0626* (2013.01)

(58) Field of Classification Search
CPC ...... G09G 3/36; G09G 3/3622; G09G 3/3648; G09G 3/3677; G09G 2320/0247; G09G 2320/0626; G02F 1/00; G02F 1/13; G02F 1/133
See application file for complete search history.

(56) References Cited

U.S. PATENT DOCUMENTS

| 9,613,585 | B2 * | 4/2017 | Tanaka | G09G 3/3648 |
| 9,865,202 | B2 * | 1/2018 | Kobayashi | G09G 3/3614 |
| 2004/0113879 | A1 | 6/2004 | Sekiguchi et al. | |
| 2014/0125569 | A1 * | 5/2014 | Nakata | G09G 3/3648 345/87 |
| 2014/0368490 | A1 * | 12/2014 | Yokonuma | G09G 3/3611 345/212 |
| 2015/0022506 | A1 * | 1/2015 | Takahashi | G06F 3/147 345/204 |
| 2015/0054863 | A1 * | 2/2015 | Tanaka | G09G 3/3406 345/691 |
| 2015/0170599 | A1 * | 6/2015 | Nakano | G09G 3/3674 345/212 |
| 2015/0332632 | A1 * | 11/2015 | Nakata | G09G 3/2092 345/690 |
| 2016/0196781 | A1 * | 7/2016 | Tanaka | G09G 3/3648 345/691 |
| 2018/0144674 | A1 * | 5/2018 | Gupta | G09G 3/3233 |
| 2018/0144687 | A1 * | 5/2018 | Lin | G09G 3/3258 |

(Continued)

FOREIGN PATENT DOCUMENTS

JP  2004-206075 A  7/2004

*Primary Examiner* — Joe H Cheng
(74) *Attorney, Agent, or Firm* — Keating & Bennett, LLP

(57) ABSTRACT

During a drive period, luminance momentarily decreases when the value β(A−B) is positive and momentarily increases when the value β(A−B) is negative. When the luminance increases during a pause period in accordance with the balance in time constant between an alignment film and a liquid crystal material that are included in a pixel forming portion, primary and secondary parasitic capacitances are adjusted so as to set the value β(A−B) to be negative.

10 Claims, 21 Drawing Sheets

(56) References Cited

U.S. PATENT DOCUMENTS

| | | | |
|---|---|---|---|
| 2018/0357975 A1* | 12/2018 | Sone | ........................ G09G 3/20 |
| 2019/0088224 A1* | 3/2019 | Fujimoto | ............. G09G 3/3655 |
| 2019/0281268 A1* | 9/2019 | Kosakai | ................... H04N 9/80 |

* cited by examiner

LUMINANCE WAVEFORM WHERE CpiRpi > ClcRlc

LUMINANCE WAVEFORM WHERE CpiRpi ≒ ClcRlc

LUMINANCE WAVEFORM WHERE CpiRpi < ClcRlc

DISPLAY DEVICE

CROSS REFERENCE TO RELATED APPLICATION(S)

This application is based on and claims the priority under 35 U.S.C. 119 to Japanese Patent Application No. 2018-072993, filed on Apr. 5, 2018, the contents of which are herein expressly incorporated by reference in its entirety.

BACKGROUND OF THE INVENTION

1. Field of the Invention

The following disclosure relates to display devices, more specifically to a display device suppressing flicker during low-frequency drive.

2. Description of the Background Art

Liquid crystal display devices are provided in various apparatuses, including television receivers, in-vehicle displays for use in automotive navigation systems, and displays for mobile terminals, such as notebook computers, tablet computers, and smartphones. There is strong demand for reduced circuit power consumption in such liquid crystal display devices, particularly, for use in mobile terminals. Accordingly, as a means to reduce power consumption, mobile terminal displays widely employ a drive method called low-frequency drive. The low-frequency drive is a mode for reducing power consumption by decreasing the drive frequency of a liquid crystal display device to one half, one quarter, etc., of a standard value. The low-frequency drive is not suitable for displaying a video because of a lengthened cycle of refreshing data signals on a liquid crystal display portion. However, the low-frequency drive is employed by liquid crystal display devices for displaying still images as an effective measure to reduce power consumption.

In the case of such a liquid crystal display device, when low-frequency drive is performed, unsteady flashing of light called flicker becomes more likely to appear on a screen. This phenomenon occurs due to pixels of a liquid crystal panel changing in luminance.

It should be noted that Japanese Laid-Open Patent Publication No. 2004-206075 discloses that to suppress flicker, a parasitic capacitance between a drain electrode of a thin-film transistor (TFT) functioning as a switching transistor in each pixel and a data signal line that supplies the pixel with a data signal (hereinafter, such a parasitic capacitance will be referred to as a "primary parasitic capacitance") and a parasitic capacitance between the drain electrode in the pixel and a data signal line that supplies an adjacent pixel with another data signal (hereinafter, such a parasitic capacitance will be referred to as a "secondary parasitic capacitance") are approximately equalized.

A voltage applied to a liquid crystal material immediately after polarity inversion is determined by a ratio of capacitance between the liquid crystal material and an alignment film, and a voltage applied to the liquid crystal material after a sufficient lapse of time is determined by a ratio of resistivity between the liquid crystal material and the alignment film. Accordingly, in Japanese Laid-Open Patent Publication No. 2004-206075, the voltage applied to the liquid crystal material is rendered constant by equalizing the liquid crystal material and the alignment film in terms of time constant. This also allows the rate of change in pixel luminance to be constant regardless of time, thereby suppressing flicker during a pause period of low-frequency drive.

However, for example, even when the resistivity of the liquid crystal material is constant, there occurs a phenomenon where luminance increases as the alignment film decreases in resistance, or luminance decreases as the alignment film increases in resistance. The reason for this is that the relationship between the liquid crystal material and the alignment film is unbalanced in terms of time constant, and such unbalance becomes noticeable particularly during low-frequency drive, with the result that flicker becomes more likely to occur. However, Japanese Laid-Open Patent Publication No. 2004-206075 does not disclose any method for suppressing flicker during low-frequency drive.

SUMMARY OF THE INVENTION

Therefore, an objective of the present disclosure is to provide a display device suppressing flicker even when a voltage applied to a liquid crystal material during a pause period of low-frequency drive changes over time.

According to some embodiments, a liquid crystal display device performing pause drive by alternating between a drive period and a pause period with predetermined frequency, the drive period being a period during which an image is displayed based on externally inputted image data, the pause period being a period during which the image is displayed based on the image data written during the drive period, the device including:

a display portion including a plurality of pixel forming portions;

a drive portion configured to drive the pixel forming portions; and a display control portion configured to control the drive portion based on the externally inputted image data, wherein, the pixel forming portion includes a liquid crystal material and alignment films between which the liquid crystal material is situated, the alignment films controlling orientation of liquid crystal molecules in the liquid crystal material, and the display control portion cancels out a luminance change in the image displayed by the pixel forming portions during the pause period, by changing luminance of the image during the drive period.

In such a configuration, when the liquid crystal material and the alignment film that are included in the pixel forming portion are not matched in terms of time constant, luminance changes during the pause period. Accordingly, such a luminance change during the pause period is cancelled out by causing a momentary luminance change during the drive period. This makes it possible to mitigate flicker during low-frequency drive.

The above and other objectives, features, modes, and effects of the invention will become more apparent from the following detailed description of the invention with reference to the accompanying drawings.

DESCRIPTION OF THE PREFERRED EMBODIMENTS

1. Luminance Change During the Pause Period of Low-Frequency Drive

Figure 1A:
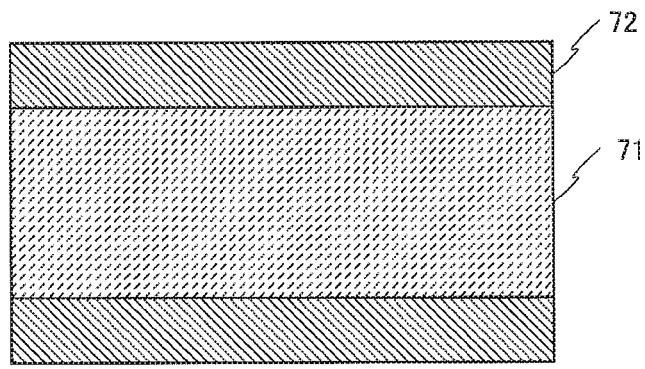
FIG. 1A is a cross-sectional view of a pixel forming portion.
Figure 1B:
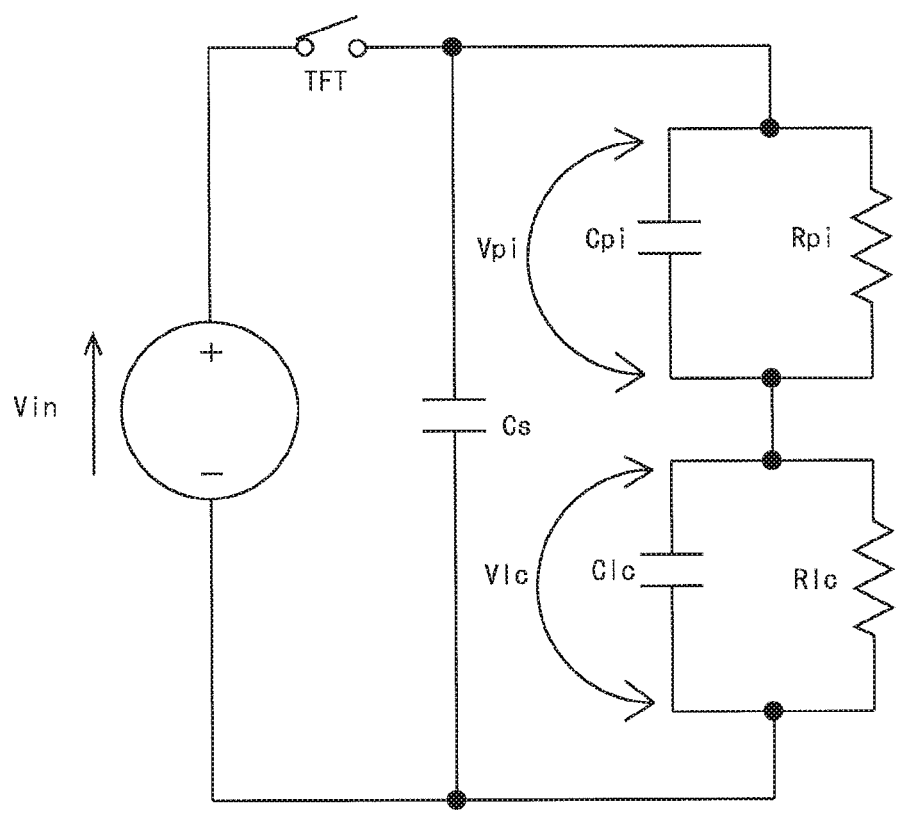
FIG. 1B is a diagram illustrating an equivalent circuit of the pixel forming portion.

Described below is luminance change during a pause period where low-frequency drive is performed by a liquid crystal display device whose liquid crystal material and alignment film are not matched in time constant. FIG. 1A is a cross-sectional view of a pixel forming portion. FIG. 1B is a diagram illustrating an equivalent circuit of the pixel forming portion.

As shown in FIG. 1A, the pixel forming portion 70 is structured by providing a liquid crystal layer 71 made of a liquid crystal material between alignment films 72. The alignment films 72 control the orientation of liquid crystal molecules included in the liquid crystal material. In the pixel forming portion 70, the orientation of the liquid crystal molecules is controlled in accordance with externally inputted image data, thereby adjusting the amount of backlight incident on a back surface in order to display an image.

Each of the liquid crystal material and the alignment film included in the pixel forming portion 70 is represented by an equivalent circuit with a capacitive element and a resistive element connected in parallel, as shown in FIG. 1B. Moreover, since the liquid crystal material is situated between the alignment films, the equivalent circuit of the liquid crystal material and the equivalent circuit of the alignment film are connected in series. Further, these equivalent circuits are connected in parallel to an auxiliary capacitance Cs provided in the pixel forming portion 70. In the case where the pixel forming portion 70 is supplied with an input voltage $V_{in}$, a voltage applied to the liquid crystal material immediately after voltage polarity inversion and a voltage applied to the liquid crystal material after a sufficient lapse of time since the inversion are respectively represented by a capacitance ratio and a resistivity ratio, more specifically, by the following equations (1) and (2):

$$V_{lc1} = C_{pi}/(C_{lc}+C_{pi}) \times V_{in} \quad (1)$$

$$V_{lc2} = R_{pi}/(R_{lc}+R_{pi}) \times V_{in} \quad (2)$$

where $V_{lc1}$ denotes the voltage applied to the liquid crystal material immediately after voltage polarity inversion, $V_{lc2}$ denotes the voltage applied to the liquid crystal material after a sufficient lapse of time since the inversion, $C_{pi}$ denotes the capacitance of the alignment film, $R_{pi}$ denotes the resistance value of the alignment film, $C_{lc}$ denotes the capacitance of the liquid crystal layer, $R_{lc}$ denotes the resistance value of the liquid crystal layer, and $V_{in}$ denotes the input voltage.

When the time constant $C_{lc}R_{lc}$ of the liquid crystal material and the time constant $C_{pi}R_{pi}$ of the alignment film are equal, the voltage applied to the liquid crystal material is constant at any time. However, in some cases, depending on design conditions, the time constants $C_{lc}R_{lc}$ and $C_{pi}R_{pi}$ cannot be equalized because of restrictions related to materials and film thickness. In such a case, luminance changes over time.

Figure 2A:
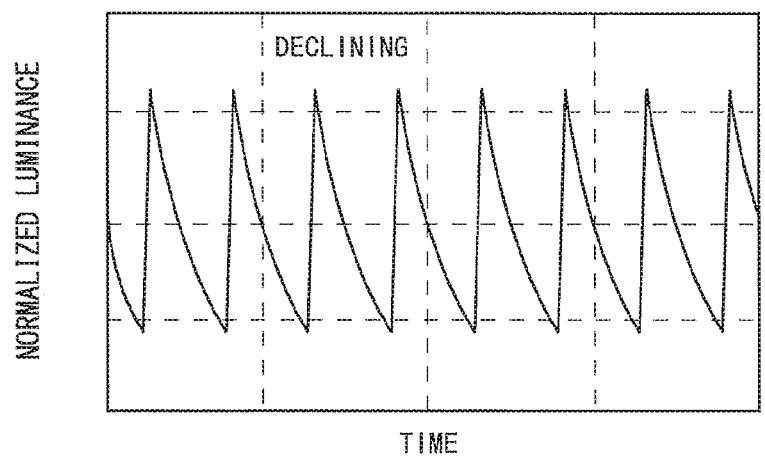
FIG. 2A is a chart showing luminance change during a pause period of low-frequency drive where an alignment film has a higher time constant than a liquid crystal material.
Figure 2B:
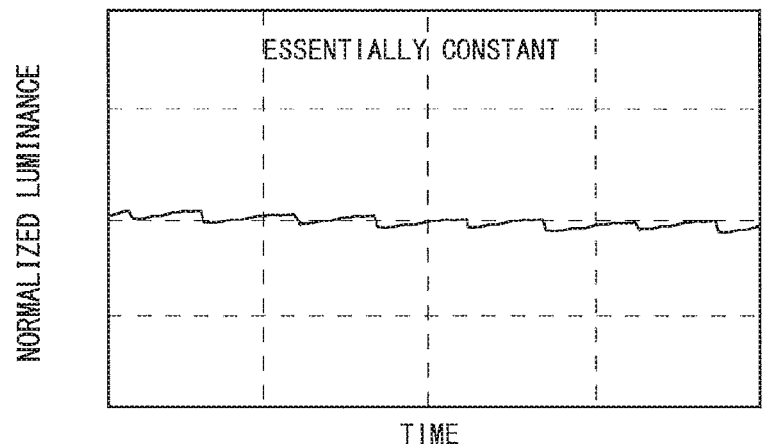
FIG. 2B is a chart showing luminance change during the pause period of low-frequency drive where the alignment film and the liquid crystal material are approximately equal in time constant.
Figure 2C:
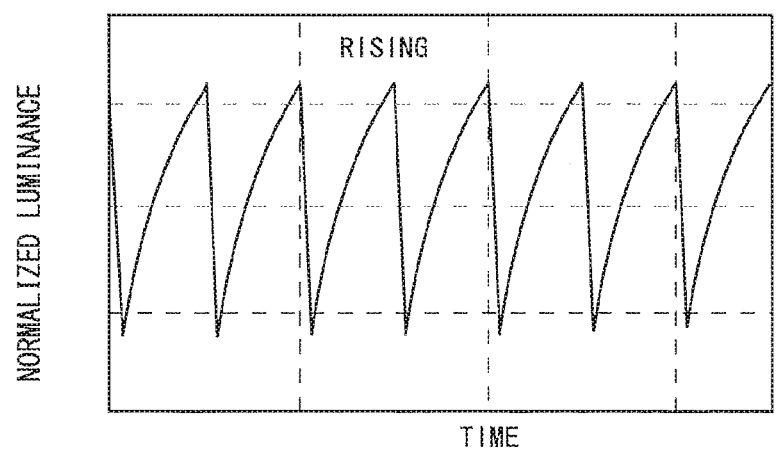
FIG. 2C is a chart showing luminance change during the pause period of low-frequency drive where the alignment film has a lower time constant than the liquid crystal material.

FIG. 2A is a chart showing luminance change where the alignment film has a higher time constant than the liquid crystal material. FIG. 2B is a chart showing luminance change where the alignment film and the liquid crystal material are approximately equal in time constant. FIG. 2C is a chart showing luminance change where the alignment film has a lower time constant than the liquid crystal material.

In the case where the alignment film and the liquid crystal material are almost matched in time constant, luminance does not change much and remains almost constant during the pause period, as shown in FIG. 2B. However, in the case where the alignment film has a higher time constant than the liquid crystal material, i.e., where $C_{pi}R_{pi}>C_{lc}R_{lc}$, luminance decreases over time during the pause period, as represented by a declining waveform shown in FIG. 2A. Moreover, in the case where the alignment film has a lower time constant than the liquid crystal material, i.e., where $C_{pi}R_{pi}<C_{lc}R_{lc}$, luminance increases over time during the pause period, as represented by a rising waveform shown in FIG. 2C.

2. Flicker Value Measurement

To quantitatively represent flicker appearing on a display under some conditions, flicker value is used. There are two types of flicker value measurement methods, one being contrast method and the other being JEITA (Japan Electronics and Information Technology Industries Association) method. The contrast method obtains the flicker value as an alternating-current component to direct-current component ratio of measured luminance, and the flicker value does not depend on drive frequency. However, human visual perception depends on frequency, and therefore, in some cases, the flicker value obtained by the contrast method might not match human visual characteristics. In particular, in the case of low-frequency drive, the difference between human visual characteristics and the flicker value obtained by the contrast method is significant.

Figure 3:
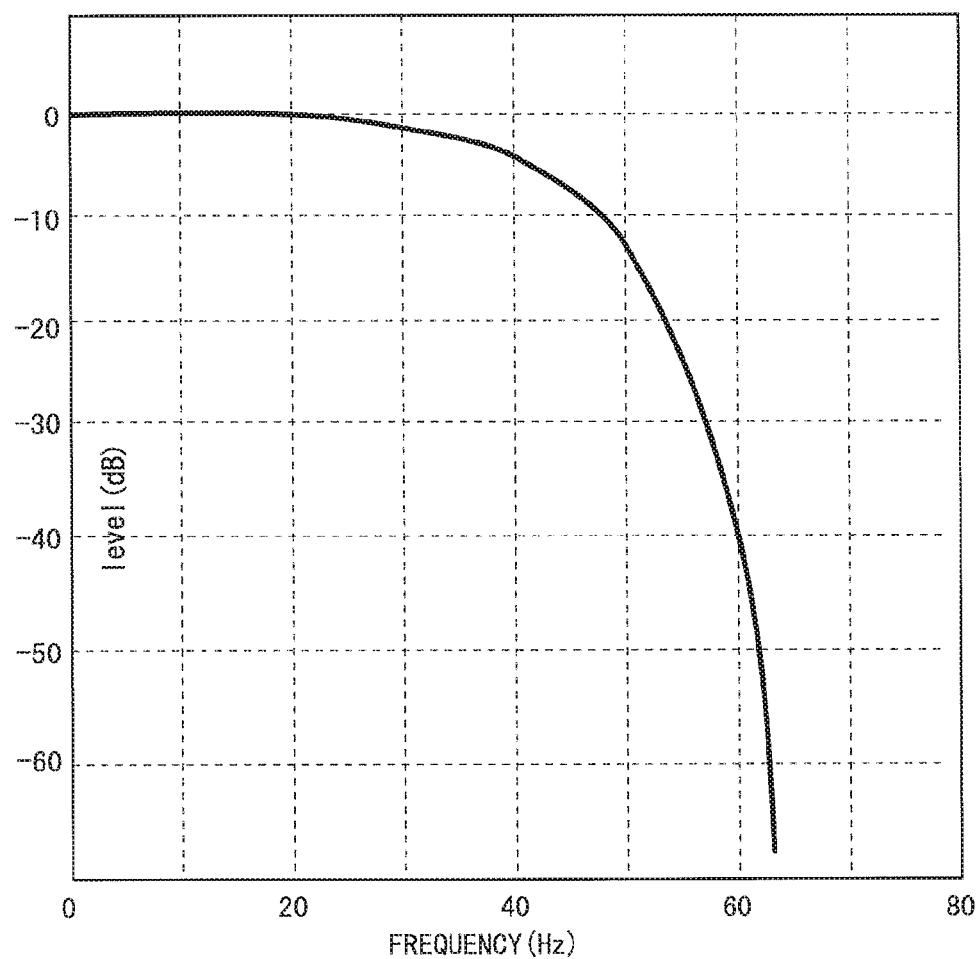
FIG. 3 is a graph showing the frequency response of an integrator used for processing a luminance signal.
Figure 4:
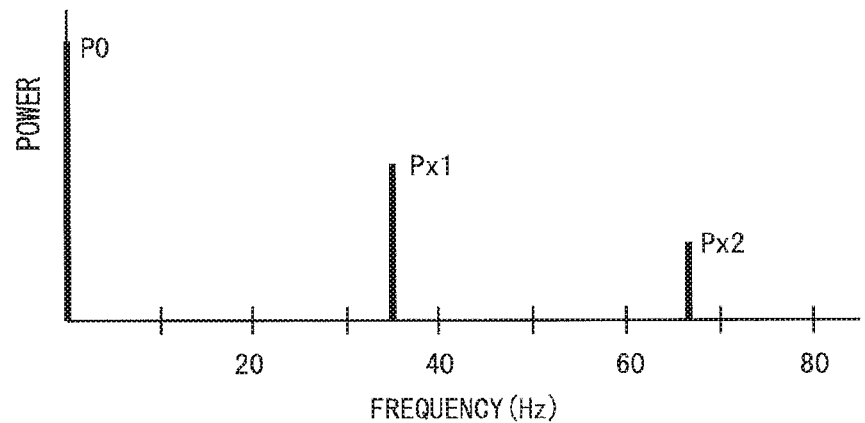
FIG. 4 is a diagram showing energy distribution of frequency components after the luminance signal is processed by an FFT analyzer.

On the other hand, the JEITA method obtains the flicker value based on energy distribution of frequency components by passing a luminance signal through an integrator which takes visual characteristics into consideration and thereafter processing the signal through a fast Fourier transform (FFT) analyzer. FIG. 3 is a graph showing the frequency response of the integrator used for processing the luminance signal. FIG. 4 is a diagram showing energy distribution of frequency components after the processing through the FFT analyzer. Similar to human frequency response, the frequency response of the integrator sharply increases at frequencies of 60 Hz or lower, as shown in FIG. 3. Moreover, as shown in FIG. 4, where 0-Hz frequency component power is $P_0$, component powers other than $P_0$ are $P_{x1}$ and $P_{x2}$, and the maximum power is $P_x$ (hence in the case shown in FIG. 4, $P_{x1}$), the JEITA method obtains the flicker value by the following equation (3):

$$\text{the flicker value according to the JEITA method}=10 \log(P_x/P_0)[\text{dB}] \qquad (3)$$

The flicker value thus obtained by the JEITA method increases with luminance change during the pause period, and therefore, provides an indication of visual characteristics of humans, whose flicker perception sharply increases at frequencies of 60 Hz or lower. Accordingly, the flicker value as measured by the JEITA method is used herein.

3. Embodiment

3.1 Configuration of the Liquid Crystal Display Device

Figure 5:
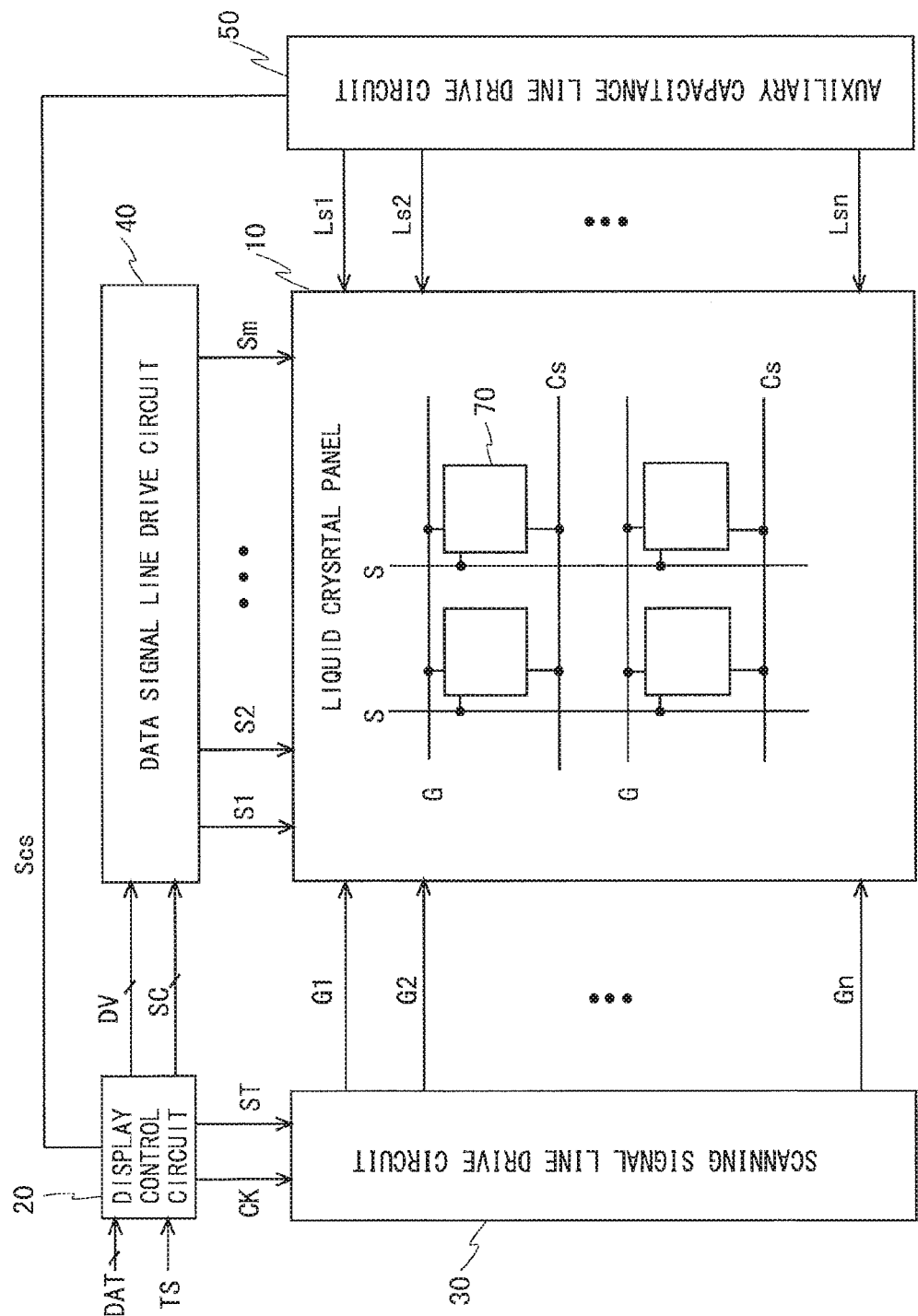
FIG. 5 is a block diagram illustrating the configuration of a liquid crystal display device according to an embodiment of the present invention.

FIG. 5 is a block diagram illustrating the configuration of a liquid crystal display device according to an embodiment of the present invention. The liquid crystal display device includes a liquid crystal panel 10, a display control circuit 20, a scanning signal line driver circuit 30, a data signal line driver circuit 40, and an auxiliary capacitance line driver circuit 50.

The liquid crystal panel 10 includes a TFT substrate, a color filter (CF) substrate, and a liquid crystal layer provided between alignment films respectively formed on the TFT substrate and the CF substrate. The TFT substrate includes m data signal lines $S_1$ to $S_m$ (where m is an integer of 1 or more), n scanning signal lines $G_1$ to $G_n$ (where n is an integer of 1 or more), n auxiliary capacitance lines $Ls_1$ to $Ls_n$, and (m×n) pixel forming portions 70, as shown in FIG. 5. The scanning signal lines $G_1$ to $G_n$ are horizontally disposed parallel to each other, the data signal lines $S_1$ to $S_m$ are disposed parallel to each other so as to cross the scanning signal lines $G_1$ to $G_n$, and the auxiliary capacitance lines $Ls_1$ to $Ls_n$ are disposed parallel to each of the scanning signal lines $G_1$ to $G_n$.

Disposed near intersections of the scanning signal lines $G_1$ to $G_n$ and the data signal lines $S_1$ to $S_m$ are the (m×n) pixel forming portions 70 in a matrix with each row consisting of m pixel forming portions and each column consisting of n pixel forming portions. The data signal line $S_j$ (where j is an integer of from 1 to m) is connected in common to the pixel forming portions 70 disposed in the j'th column. Both the scanning signal line $G_i$ (where i is an integer of from 1 to n) and the auxiliary capacitance line $Ls_i$ are connected in common to the pixel forming portions 70 disposed in the i'th column. The CF substrate includes a common electrode (not shown) provided in common for the pixel forming portions 70 and a color filter (not shown) for color image display.

The display control circuit 20 is externally provided with control signals TS, such as a horizontal synchronization signal and a vertical synchronization signal, along with display image data DAT. In accordance with these signals, the display control circuit 20 outputs a clock signal CK and a start pulse ST to the scanning signal line driver circuit 30, a control signal SC and a digital image signal DV to the data signal line driver circuit 40, and a control signal $S_{cs}$ to the auxiliary capacitance line driver circuit 50.

The scanning signal line driver circuit 30 outputs selection signals sequentially to the scanning signal lines $G_1$ to $G_n$. As a result, the scanning signal lines $G_1$ to $G_n$ are sequentially selected one by one, with the result that the pixel forming portions 70 are sequentially selected in one row at a time.

In accordance with the control signal SC and the digital image signal DV, the data signal line driver circuit 40 provides the data signal lines $S_1$ to $S_m$ with voltages (data voltages) corresponding to the digital image signal DV. As a result, the data voltages are written in the pixel forming portions 70 selected in one row at a time. Note that the liquid crystal panel will also be referred to as the "display portion", and the scanning signal line driver circuit 30 and the data signal line driver circuit 40 will also be collectively referred to as the "drive portion".

Figure 6:
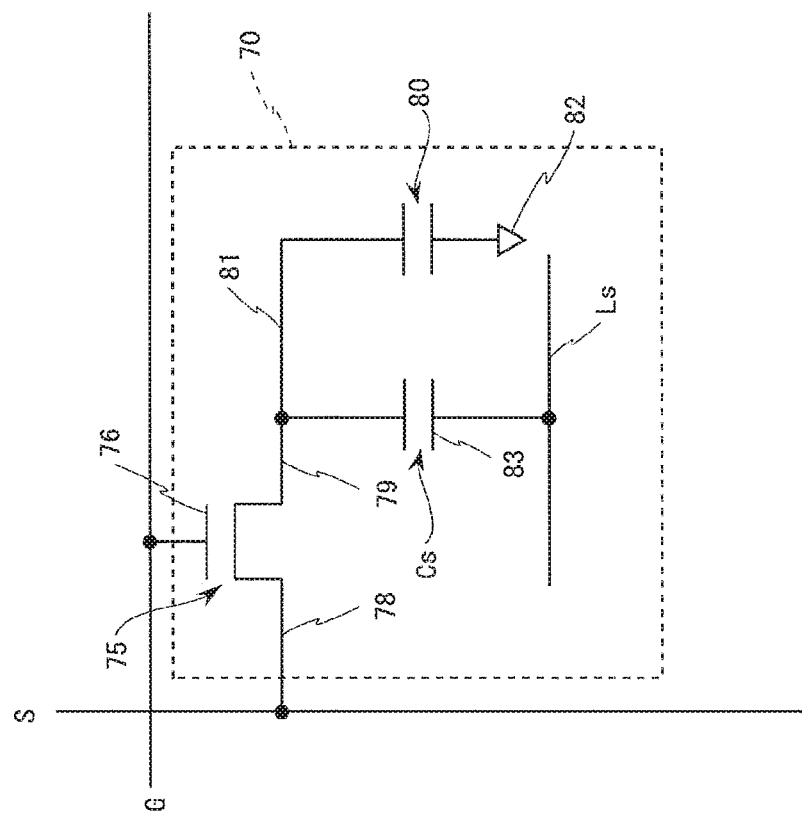
FIG. 6 is a circuit diagram illustrating an equivalent circuit of a pixel forming portion formed in a liquid crystal panel included in the liquid crystal display device shown in FIG. 5.

FIG. 6 is a circuit diagram illustrating an equivalent circuit of the pixel forming portion formed in the liquid crystal panel. As shown in FIG. 6, the pixel forming portion 70 is provided with a thin-film transistor (TFT) 75 functioning as a switching element. The TFT 75 has a gate electrode 76 connected to the scanning signal line G, a source electrode 78 connected to the data signal line S, and a drain electrode 79 connected to a pixel electrode 81.

In the present embodiment, as the TFT 75, a TFT with a channel layer made of, for example, an oxide semiconductor is used. More specifically, the channel layer of the TFT 75 is formed of IGZO (InGaZnOx), whose main components are indium (In), gallium (Ga), zinc (Zn), and oxygen (O). The TFT with the channel layer made of such IGZO has a considerably lower off-leak current than silicon-based TFTs with channel layers made of amorphous silicon or suchlike, and voltages written in a liquid crystal capacitance 80 and an auxiliary capacitance Cs can be held for a longer period of time. Accordingly, the liquid crystal display device can display an image by low-frequency drive. Note that similar effects can also be achieved when the channel layer is made of an oxide semiconductor excluding IGZO and including, for example, at least one of the following: indium, gallium, zinc, copper (Cu), silicon (Si), tin (Sn), aluminum (Al), calcium (Ca), germanium (Ge), and lead (Pb).

Furthermore, the pixel forming portion 70 includes the liquid crystal capacitance 80 and the auxiliary capacitance Cs, as mentioned earlier. The liquid crystal capacitance 80 is formed by the pixel electrode 81, the common electrode 82, and the liquid crystal layer (not shown) situated therebetween. The common electrode 82 is connected to a common electrode driver circuit (not shown) via a common electrode line (not shown). The auxiliary capacitance Cs is formed by the pixel electrode 81, an auxiliary capacitance electrode 83, and an insulating film (not shown) situated therebetween. The auxiliary capacitance electrode 83 is connected to the auxiliary capacitance line Ls, which is connected to the auxiliary capacitance line driver circuit 50. The auxiliary capacitance line driver circuit 50 drives the auxiliary capacitance electrode 83.

3.2 Luminance Change Rate

Figure 7:
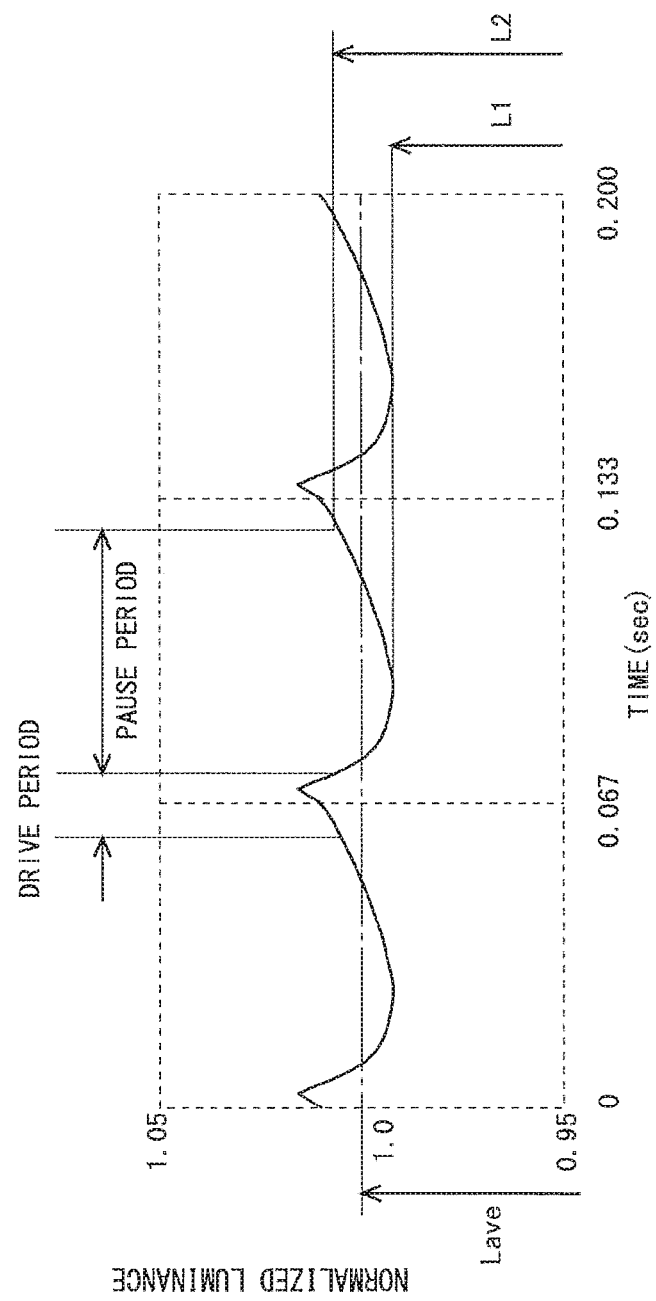
FIG. 7 is a diagram describing the definition of a luminance change rate during the pause period where the liquid crystal display device shown in FIG. 5 is driven in low-frequency drive mode.

FIG. 7 is a diagram describing the definition of luminance change rate during the pause period of low-frequency drive. As shown in FIG. 7, in the case where low-frequency drive is performed, data voltages are applied to the pixel forming portions every 1/60 of a second for image display during a drive period, and the data voltages applied during the drive period are retained during the pause period. The luminance change rate during the pause period is represented by the following equation (4), described with reference to FIG. 7:

$$P=(L_2-L_1)/L_{ave} \quad (4)$$

where $L_1$ denotes the minimum luminance during the pause period, $L_2$ denotes the maximum luminance during the pause period, and $L_{ave}$ denotes the average luminance during the pause period.

Figure 8:
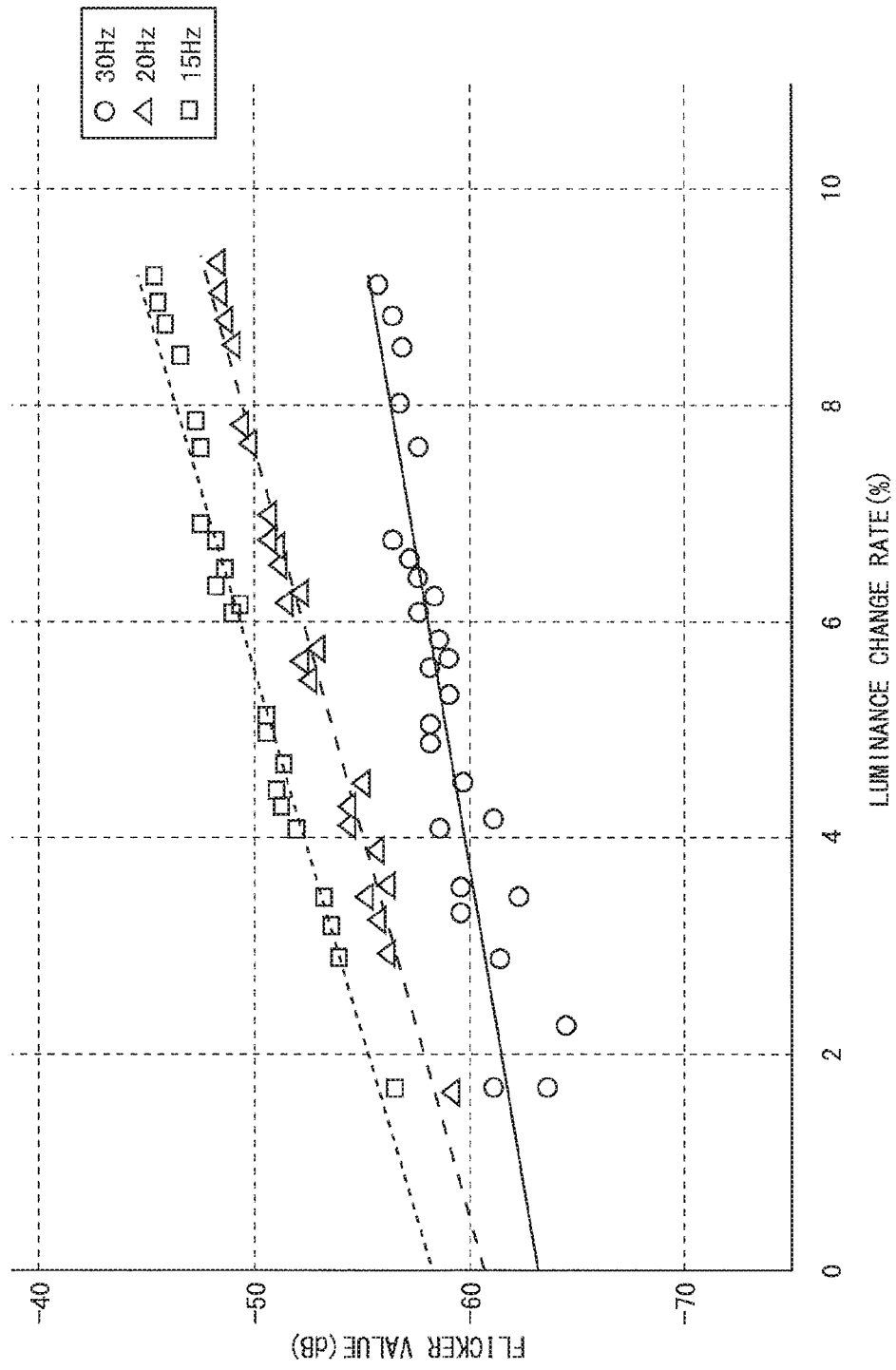
FIG. 8 is a graph showing the relationship of the luminance change rate during the pause period shown in FIG. 7 with flicker value.

FIG. 8 is a graph showing the relationship between luminance change rate and flicker value during the pause period. The relationship between luminance change rate and flicker value during the pause period will be described for drive frequencies of 15 Hz, 20 Hz, and 30 Hz with reference to FIG. 8. In any case of the drive frequencies, the flicker value during the pause period increases with the luminance change rate. Moreover, the flicker value increases in descending order of drive frequency: 30 Hz, 20 Hz, and 15 Hz, i.e., in descending order of the duration of the pause period. Note that the foregoing is directed to the case where the luminance change rate during the pause period is positive, but in the case where the luminance change rate during the pause period is negative, similarly, the flicker value during the pause period increases with the absolute value of the luminance change rate, and also increases with the duration of the pause period.

3.3 Luminance Change During the Pause Period with 30-Hz Drive Frequency

Figure 9:
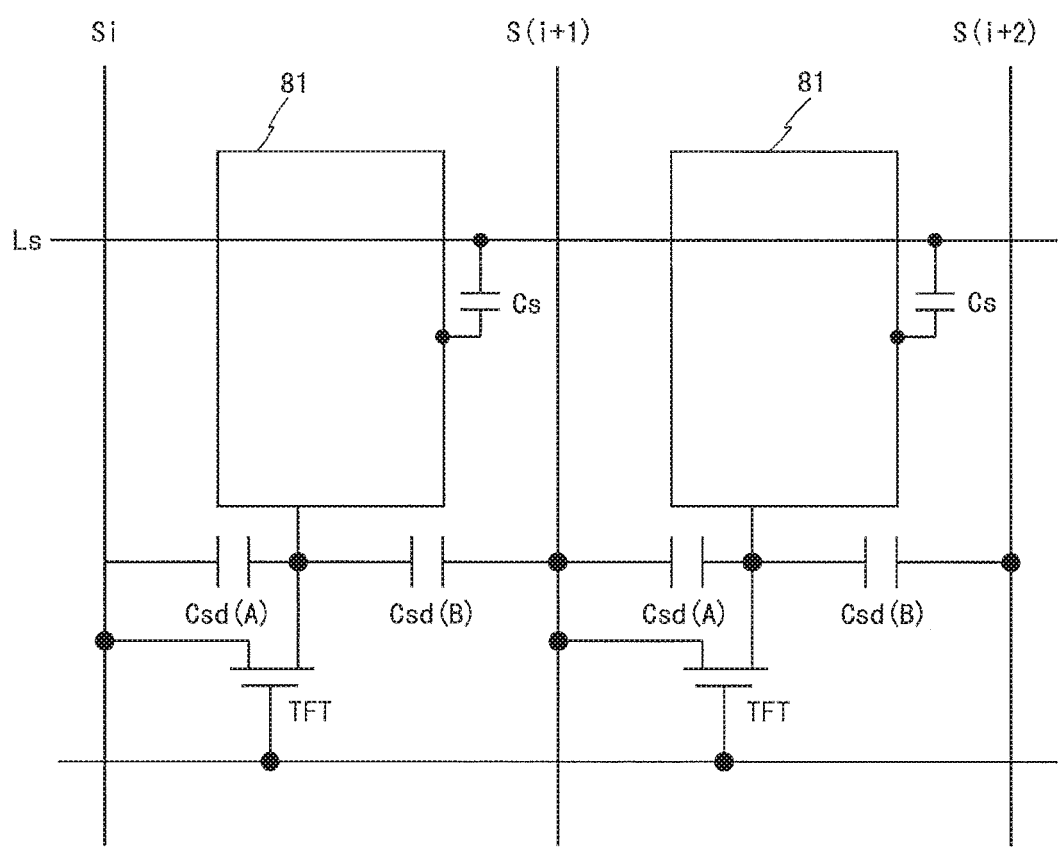
FIG. 9 is a diagram illustrating parasitic capacitances formed in pixel forming portions included in the liquid crystal display device shown in FIG. 5.

FIG. 9 is a diagram illustrating parasitic capacitances formed in pixel forming portions. As shown in FIG. 9, each pixel forming portion (or pixel) includes primary parasitic capacitance $C_{sd(A)}$ formed by a data signal line for the pixel and a drain electrode of a TFT within the pixel, and also includes secondary parasitic capacitance $C_{sd(B)}$ formed by the drain electrode of the TFT and a data signal line for an adjacent pixel. There is another other parasitic capacitance formed between the drain electrode and a gate electrode of the TFT, but such a parasitic capacitance is not directly relevant to the present embodiment, and therefore, any description thereof will be omitted herein.

Figure 10:
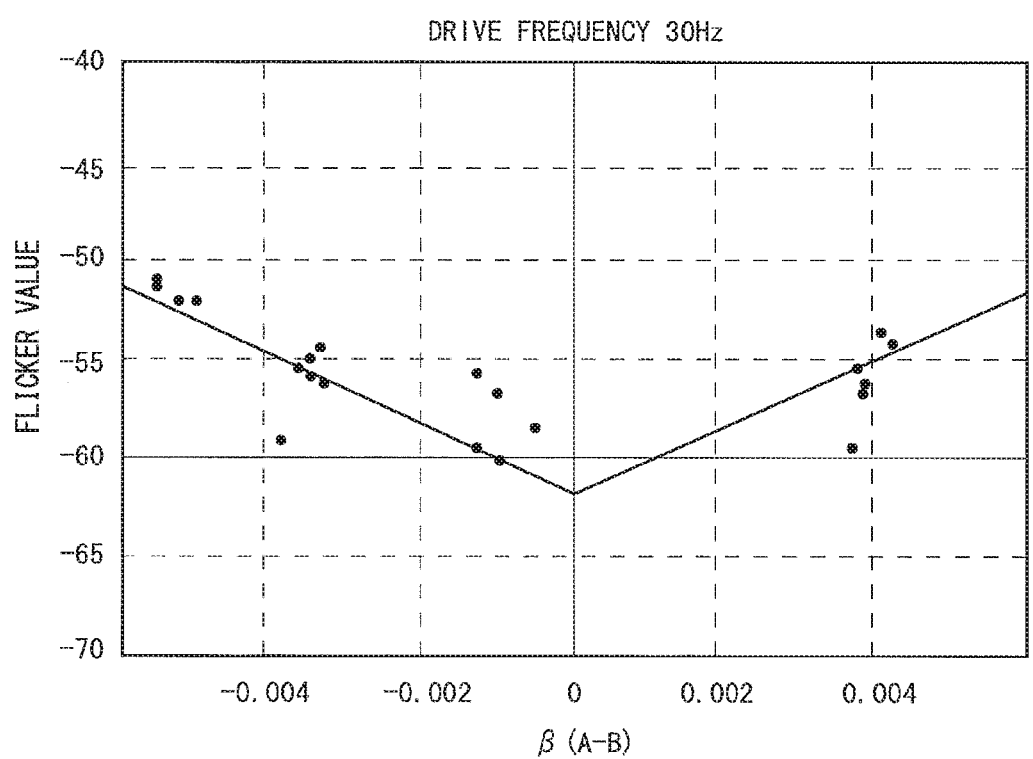
FIG. 10 is a graph showing the relationship between value β(A−B) and flicker value where the drive frequency of the liquid crystal display device shown in FIG. 5 is 30 Hz.

FIG. 10 is a graph showing the relationship between value β(A–B) and flicker value where the drive frequency is 30 Hz. Here, the value β(A–B) is an index represented by the following equation (5):

$$\beta(A-B)=\{C_{sd(A)}-C_{sd(B)}\}/C_{pi} \quad (5)$$

where $C_{pi}$ denotes the liquid crystal capacitance formed by the pixel electrode and the common electrode. As shown in FIG. 10, the flicker value is minimized where β(A–B)≈0, and as the absolute value of β(A–B) increases, the flicker value also increases, resulting in more flicker.

Figure 11:
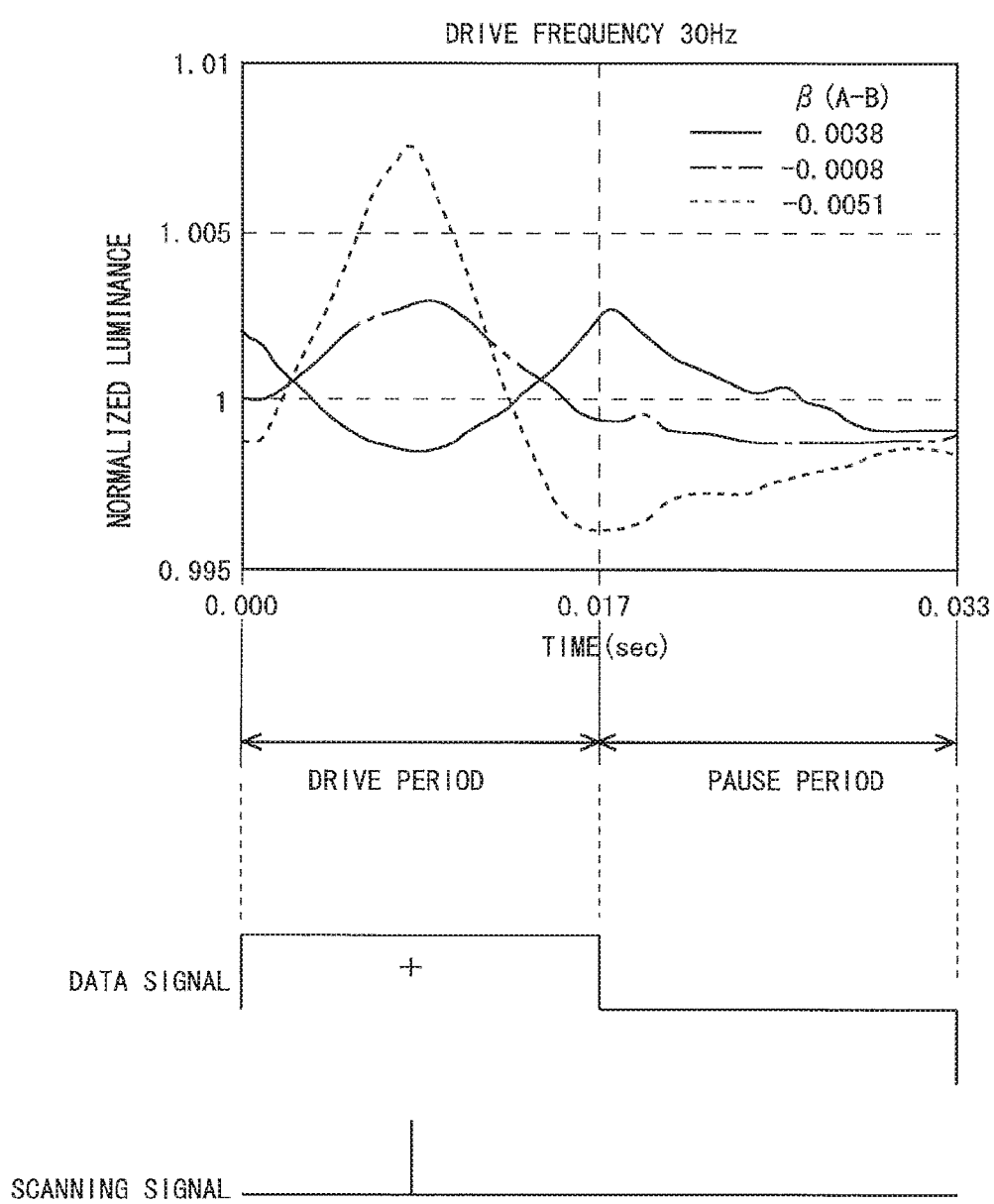
FIG. 11 is a graph showing the relationship between temporal luminance change and value β(A−B) where the drive frequency of the liquid crystal display device shown in FIG. 5 is 30 Hz.

FIG. 11 is a graph showing the relationship between temporal luminance change and value β(A–B) where the drive frequency is 30 Hz. As shown in FIG. 11, data voltages are applied to the data signal lines during the first half of the drive period. As a result, luminance momentarily increases when the value β(A–B) is negative and momentarily decreases when the value β(A–B) is positive. In this case, the higher the absolute value of β(A–B) is, the more luminance increases or decreases. Once scanning signals are inputted during the second half of the drive period, the TFTs are turned on, and the data voltages are written in the pixels, with the result that luminance returns to the original state. Accordingly, the luminance that momentarily increased decreases when the value β(A–B) is negative, whereas the luminance that momentarily decreased increases when the value β(A–B) is positive. Thereafter, once the pause period is started, luminance increases but not significantly because the pause period is short.

Figure 12:
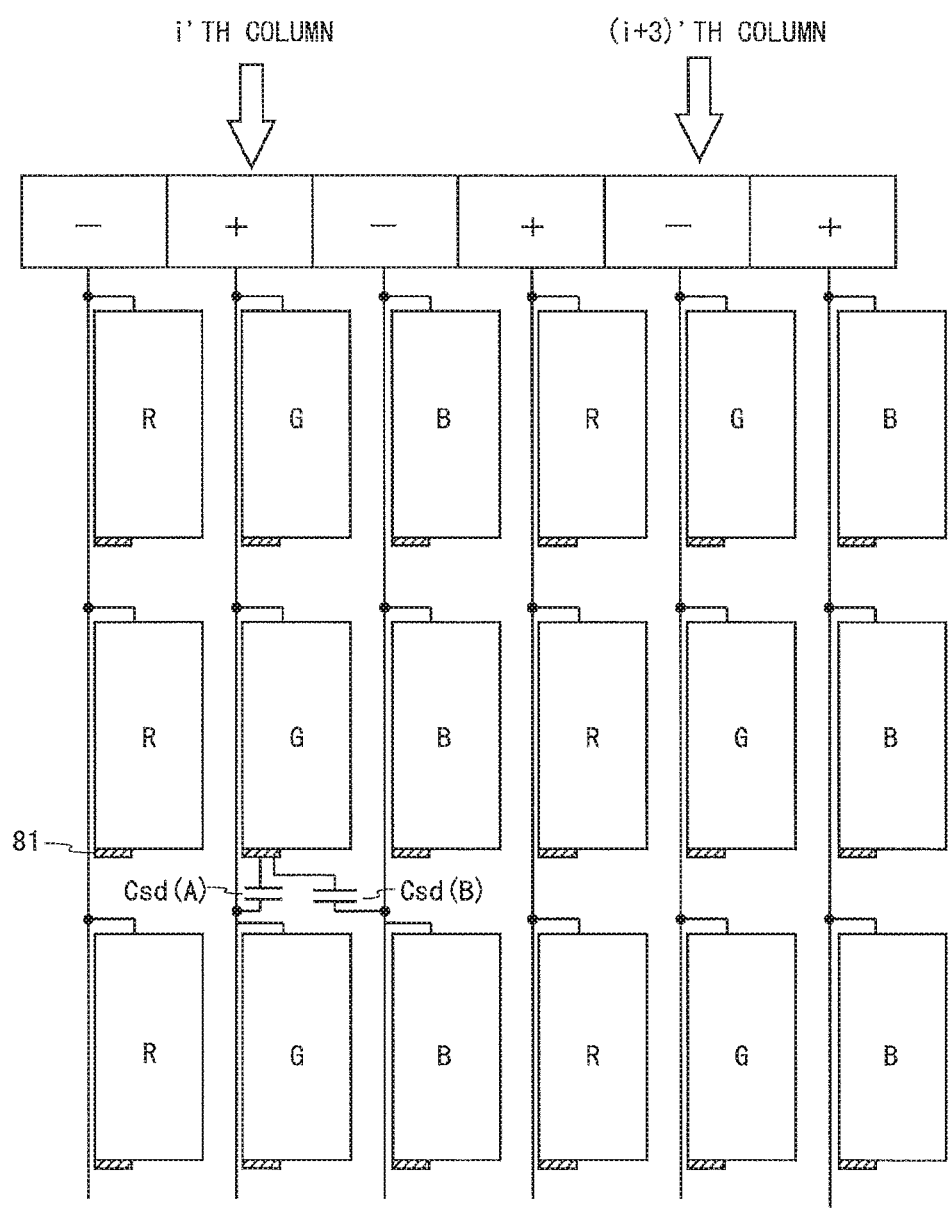
FIG. 12 is a diagram illustrating the arrangement of pixels (pixel forming portions) where the liquid crystal display device shown in FIG. 5 is driven in column inversion drive mode.
Figure 13A:
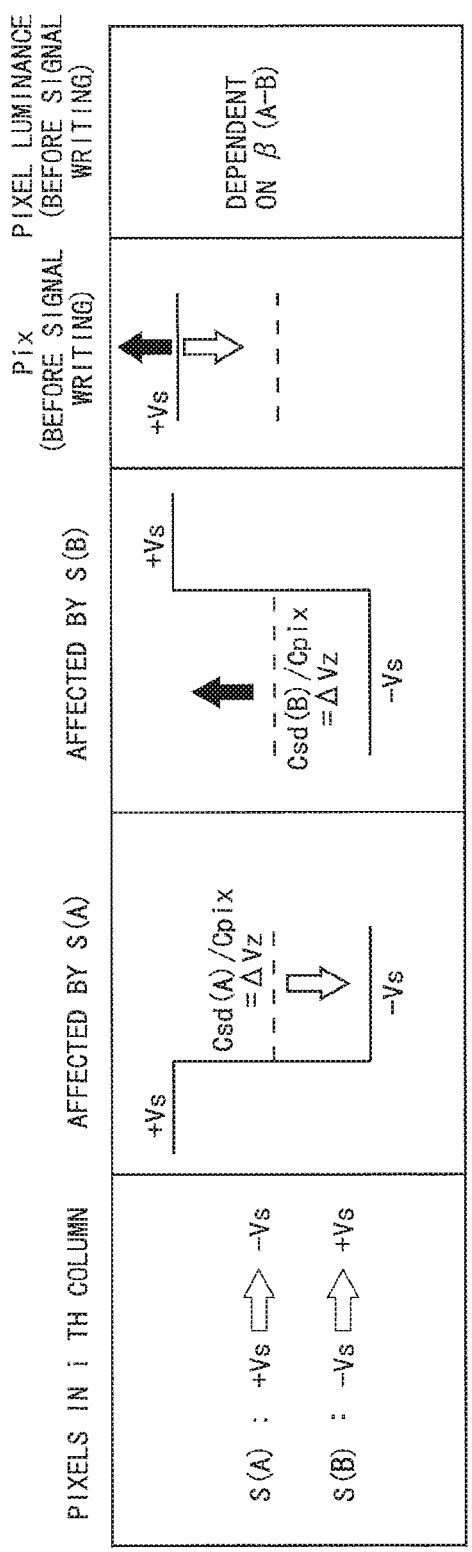
FIG. 13A is a diagram illustrating behavior of pixels connected to a data signal line whose data voltage switches from $+V_s$ to $-V_s$.
Figure 13B:
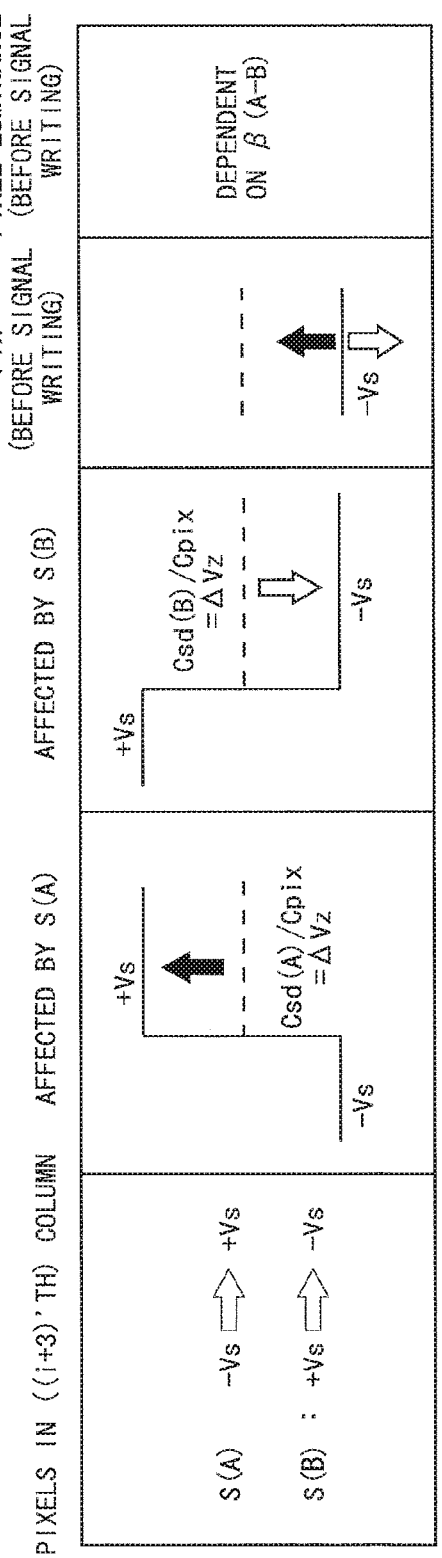
FIG. 13B is a diagram illustrating behavior of pixels connected to a data signal line whose data voltage switches from $-V_s$ to $+V_s$.

The reason why luminance changes depending on the value β(A–B) during the drive period will be described. FIG. 12 is a diagram illustrating the arrangement of pixels (i.e., pixel forming portions) where a liquid crystal display device performs column inversion drive. FIG. 13A is a diagram illustrating behavior of pixels connected to a data signal line whose data voltage switches from $+V_s$ to $-V_s$. FIG. 13B is a diagram illustrating behavior of pixels connected to a data signal line whose data voltage switches from $-V_s$ to $+V_s$. The following description will be provided focusing on green pixels in the i'th and (i+3)'th columns from among the red (R), green (G), and blue (B) pixels shown in FIG. 12.

As shown in FIG. 13A, in the case of the G pixels in the i'th column connected to the data signal line whose data voltage switches from $+V_s$ to $-V_s$ at some point, when the data voltage changes by $\Delta V_z$, the voltage across the G pixels is affected by the data signal line connected thereto and thereby tends to change such that luminance decreases by $C_{sd(A)}/C_{pix} \times \Delta V_z$. In this case, the voltage across the G pixels is also affected by another data signal line connected to adjacent pixels and thereby tends to change such that luminance increases by $C_{sd(B)}/C_{pix} \times \Delta V_z$. Accordingly, the voltage across the G pixels changes by a value as represented by the following equation (6), and luminance decreases when the value $\beta(A-B)$ is positive and increases when the value $\beta(A-B)$ is negative.

$$(C_{sd(A)} - C_{sd(B)}/C_{pix} \times \Delta V_z = \beta(A-B) \times \Delta V_s \quad (6)$$

On the other hand, in the case of the G pixels in the (i+3)'th column connected to the data voltage line whose data voltage switches from $-V_s$ to $+V_s$ at some point, as shown in FIG. 13B, when the data signal changes by $\Delta V_z$, the voltage across the G pixels is affected by the data signal line connected thereto and thereby tends to change such that luminance decreases by $C_{sd(A)}/C_{pix} \times \Delta V_z$. In this case, the voltage across the G pixels is also affected by another data signal line connected to adjacent pixels and thereby tends to change such that luminance increases by $C_{sd(B)}/C_{pix} \times \Delta V_z$.

In these cases, both the G pixels in the i'th and (i+3)'th columns are increased in luminance at the same time, and therefore, the luminances thereof do not cancel out each other. The same applies to the case where the luminances decrease at the same time. Accordingly, after the switching of the data voltage polarity until scanning signals are inputted, the voltage across the G pixels changes by the value represented by equation (6), and the luminances increase when the value $\beta(A-B)$ is positive and decrease when the value $\beta(A-B)$ is negative.

Subsequently, when scanning signals are provided so that the TFTs are turned on, data signals are written in the G pixels through the data signal lines. As a result, the luminances of the G pixels are determined by the data signals being written and thereby return to the previous level at which the luminances were before being affected by the data signals.

In this manner, in the case where the value $\beta(A-B)$ is positive, luminance decreases immediately after data signal polarity inversion and increases once scanning signals are inputted. On the other hand, in the case where the value $\beta(A-B)$ is negative, luminance increases immediately after data signal polarity inversion and decreases once scanning signals are inputted. In either case, luminance increases thereafter when the pause period is started.

3.4 Relationship Between Value $\beta(A-B)$ and Luminance Change

Figure 14:
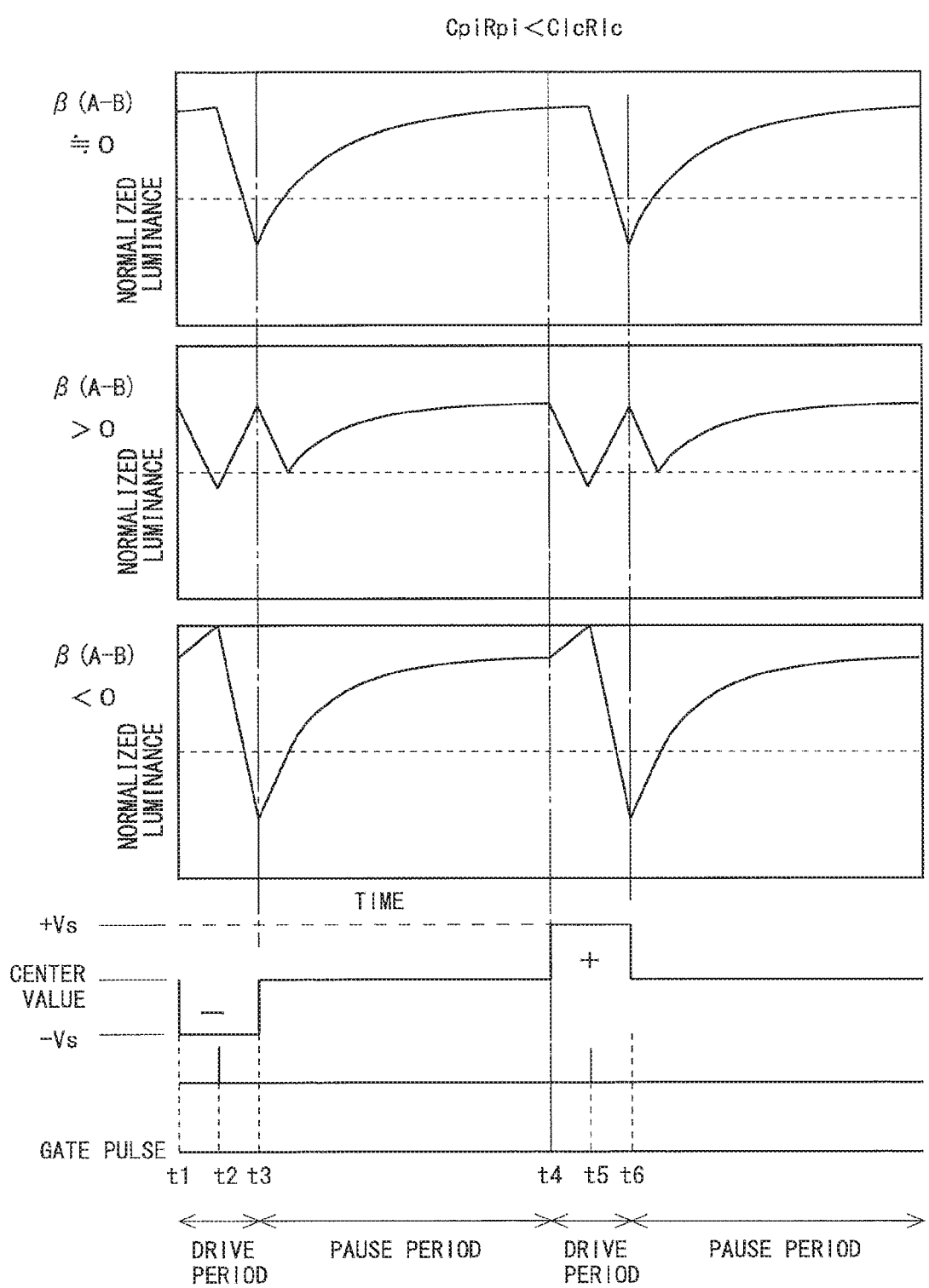
FIG. 14 is a diagram showing the relationship between value β(A−B) and luminance change in the liquid crystal display device shown in FIG. 5 where luminance increases during the pause period.
Figure 15:
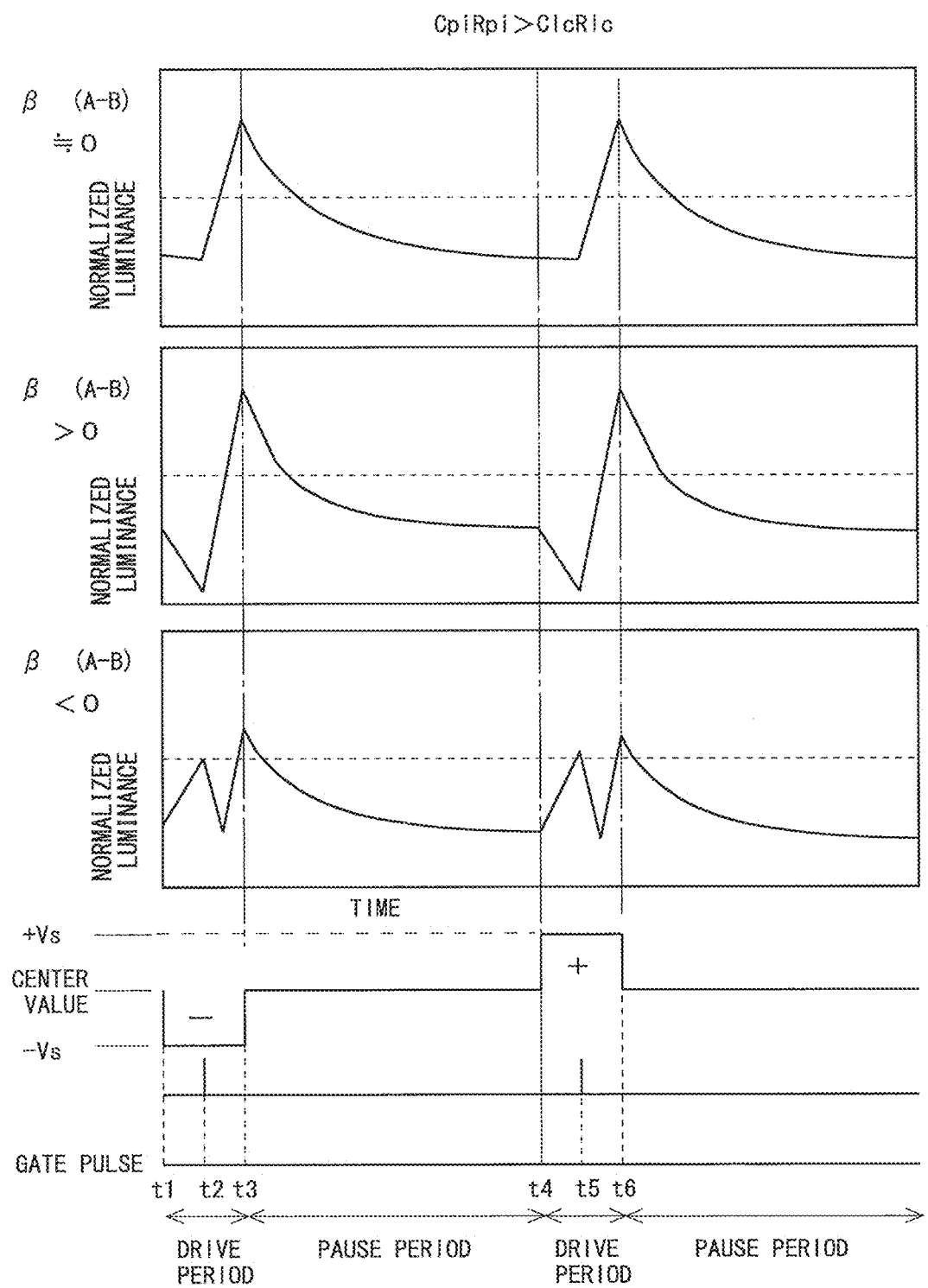
FIG. 15 is a diagram showing the relationship between value β(A−B) and luminance change in the liquid crystal display device shown in FIG. 5 where luminance decreases during the pause period.

Next, luminance changes, both increasing and decreasing, during the pause period will be individually described with respect to the cases where the value $\beta(A-B)$ is approximately 0, positive, or negative. FIG. 14 is a diagram showing the relationship between value $\beta(A-B)$ and luminance change where luminance increases during the pause period. FIG. 15 is a diagram showing the relationship between value $\beta(A-B)$ and luminance change where luminance decreases during the pause period. Note that as described earlier, luminance changes in accordance with the relationship in magnitude between the time constant $C_{lc}R_{lc}$ of the liquid crystal material and the time constant $C_{pi}R_{pi}$ of the alignment film. Such luminance changes are as follows:

luminance increases where $C_{pi}R_{pi} < C_{lc}R_{lc}$;
luminance remains almost constant where $C_{pi}R_{pi} = C_{lc}R_{1c}$; and
luminance decreases where $C_{pi}R_{pi} > C_{lc}R_{lc}$.

Referring to FIGS. 14 and 15, such luminance changes will be described in relation to the value $\beta(A-B)$. Note that in the following description, time t1 is the time at which the potential across the data signal line changes from a center value to the same value as the potential of the data signal, time t2 is the time at which the scanning signal is inputted to the scanning signal line, and time t3 is the time at which the potential across the data signal line returns from the same value as the potential of the data signal to the center value.

$$\beta(A-B) \approx 0 \quad (1)$$

(a) At time t1, the potential across the data signal line changes by $\Delta V_z$ from the center value to $+V_s$ (or $-V_s$), but even when the potential across the data signal line changes, there is no luminance change because $\beta(A-B) \approx 0$. Accordingly, luminance changes in accordance with the balance in CR time constant between the liquid crystal material and the alignment film. More specifically, luminance increases where $C_{pi}R_{pi} < C_{lc}R_{lc}$, decreases where $C_{pi}R_{pi} > C_{lc}R_{lc}$, and remains almost constant where $C_{pi}R_{pi} = C_{lc}R_{lc}$.

(b) At time t2, the gate electrode of the TFT is turned on, whereby the potential $+V_s$ across the data signal line is applied to the pixel electrode via the TFT as a drain voltage $V_d$. As a result, the luminance of the pixel changes to a value determined by the voltage $V_d$ written therein anew, toward the previous level at which the luminance was before being affected by the potential $V_s$ across the data signal line. Subsequently, the voltage $V_d$ written in the pixel decreases through discharge, and therefore, the luminance of the pixel decreases.

(c) At time t3, the potential of the data signal changes by $\Delta V_z$ from $+V_s$ (or $-V_s$) to the center value, but in this case also, there is no luminance change because $\beta(A-B) \approx 0$. Accordingly, the luminance of the pixel changes in accordance with the balance in CR time constant between the liquid crystal material and the alignment film. More specifically, the luminance increases where $C_{pi}R_{pi} < C_{lc}R_{lc}$, decreases where $C_{pi}R_{pi} > C_{lc}R_{lc}$, and remains almost constant where $C_{pi}R_{pi} = C_{lc}R_{lc}$.

$$\beta(A-B) > 0 \quad (2)$$

(a) At time t1, the potential across the data signal line changes by $\Delta V_z$ from the center value to $+V_s$ (or $-V_s$), whereby luminance changes in accordance with the balance in CR time constant between the liquid crystal material and the alignment film, and, in addition, the voltage across the data signal line decreases by $\beta(A-B) \times \Delta V_S$, with the result that the luminance of the pixel decreases.

(b) At time t2, the gate electrode of the TFT is turned on, and the potential $+V_s$ across the data signal line is applied to the pixel electrode via the TFT as a drain voltage $V_d$. As a result, the luminance of the pixel changes to a value determined by the voltage $V_d$ written in the pixel anew, toward the previous level at which the luminance was before being affected by a source signal. Subsequently, the voltage $V_d$ written in the pixel decreases through discharge, with the result that the luminance of the pixel decreases.

(c) At time t3, the potential of the data signal changes by $\Delta V_z$ from $+V_s$ (or $-V_s$) to the center value, whereby luminance changes in accordance with the balance in CR time constant between the liquid crystal material and the alignment film, and in addition, the voltage applied to the pixel decreases by $\beta(A-B)\times\Delta V_s$, with the result that the luminance of the pixel decreases.

$$\beta(A-B)<0 \qquad (3)$$

(a) At time t1, the potential across the data signal line changes by $\Delta V_z$ from the center value to $+V_s$ (or $-V_s$), whereby luminance changes in accordance with the balance in CR time constant between the liquid crystal material and the alignment film, and in addition, the potential across the data signal line increases by $\beta(A-B)\times\Delta V_s$, with the result that the luminance of the pixel increases.

(b) At time t2, the gate electrode of the TFT is turned on, and the potential $+V_s$ across the data signal line is applied to the pixel electrode via the TFT as a drain voltage $V_d$. As a result, the luminance of the pixel changes to a value determined by the voltage $V_d$ written in the pixel anew, toward the previous level at which the luminance was before being affected by a data signal. Subsequently, the voltage $V_d$ written in the pixel decreases through discharge, with the result that the luminance of the pixel decreases.

(c) At time t3, the potential of the data signal changes by $\Delta V_z$ from $+V_s$ (or $-V_s$) to the center value, whereby luminance changes in accordance with the balance in CR time constant between the liquid crystal material and the alignment film, and in addition, the voltage applied to the pixel increases by $\beta(A-B)\times\Delta V_s$, with the result that the luminance of the pixel increases.

3.5 Luminance Change During the Pause Period with 15-Hz Drive Frequency

Figure 16:
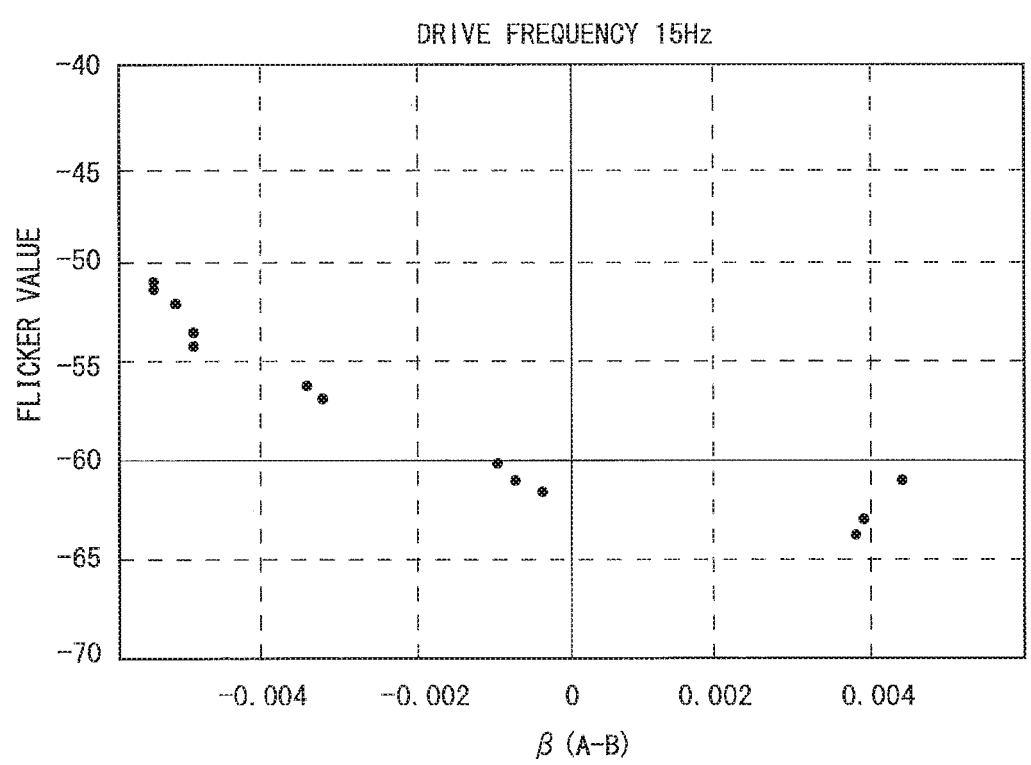
FIG. 16 is a graph showing the relationship between value β(A−B) and flicker value where the drive frequency is 15 Hz.

FIG. 16 is a graph showing the relationship between value $\beta(A-B)$ and flicker value where the drive frequency is 15 Hz. In the case of the 15-Hz drive frequency, unlike in the case of the 30-Hz drive frequency, the flicker value is minimized where $\beta(A-B)>0$, rather than where $\beta(A-B)\approx 0$, as shown in FIG. 16. The reason for this is that the increase in luminance during the pause period due to the time constant $C_{lc}R_{lc}$ of the liquid crystal material being higher than the time constant $C_{pi}R_{pi}$ of the alignment film is cancelled out by a momentary luminance decrease during the drive period, with the result that the flicker value is decreased during the pause period. On the other hand, in the case where luminance decreases during the pause period, the decrease in luminance is cancelled out by a momentary luminance increase during the drive period, with the result that the flicker value is decreased during the pause period.

Figure 17:
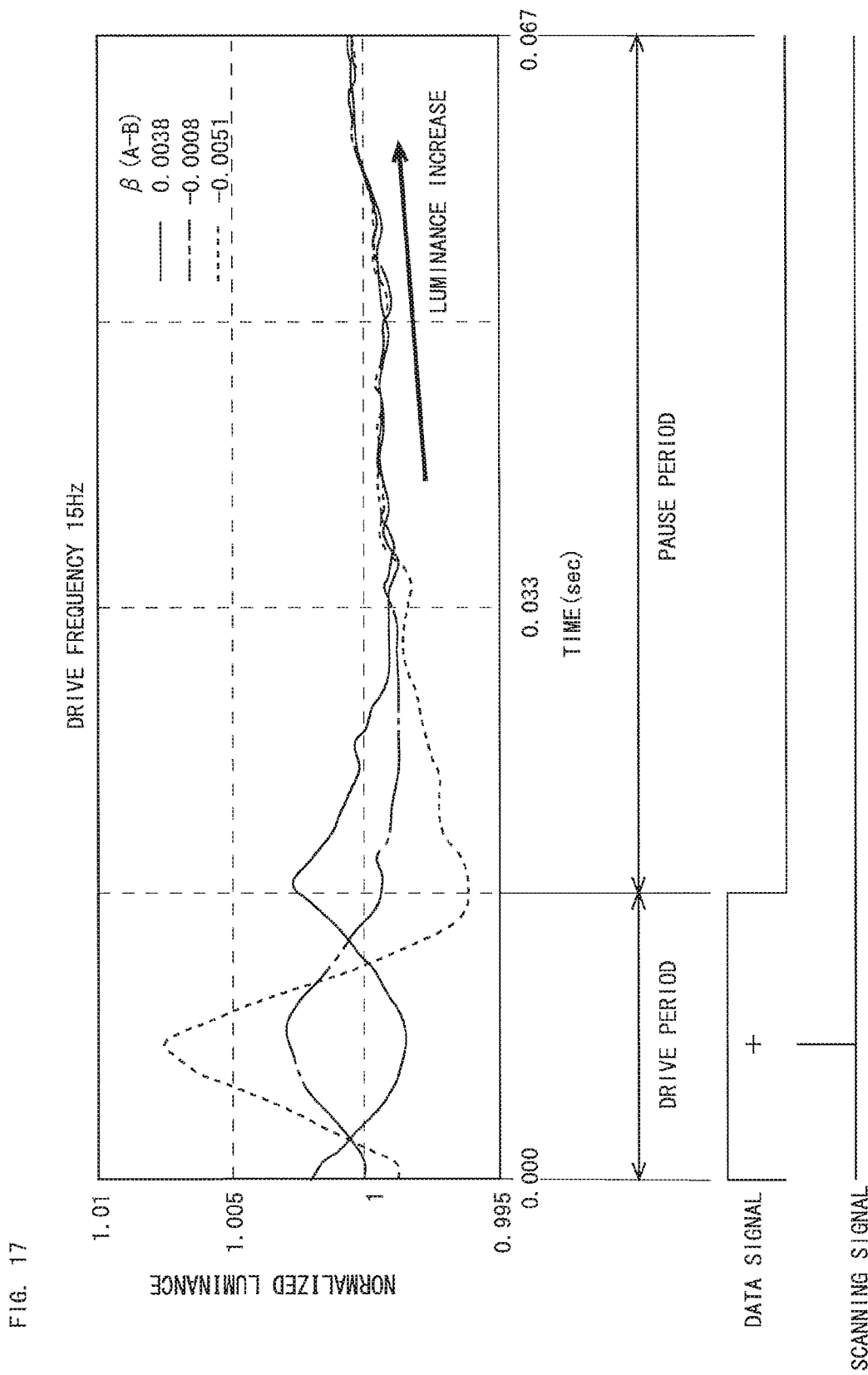
FIG. 17 is a graph showing the relationship between temporal luminance change and value β(A−B) in the liquid crystal display device shown in FIG. 5 where the drive frequency is 15 Hz.

FIG. 17 is a graph showing the relationship between temporal luminance change and value $\beta(A-B)$ where the drive frequency is 15 Hz. As shown in FIG. 17, during the drive period, luminance momentarily increases when the value $\beta(A-B)$ is negative or approximately 0 and momentarily decreases when the value $\beta(A-B)$ is positive. Subsequently, when a scanning signal is applied to the gate electrode, a data voltage of the data signal line is written in the pixel, with the result that luminance changes to the previous level at which the luminance was before data voltage polarity change. Once the pause period is started, the luminance increases regardless of the value $\beta(A-B)$.

Figure 18:
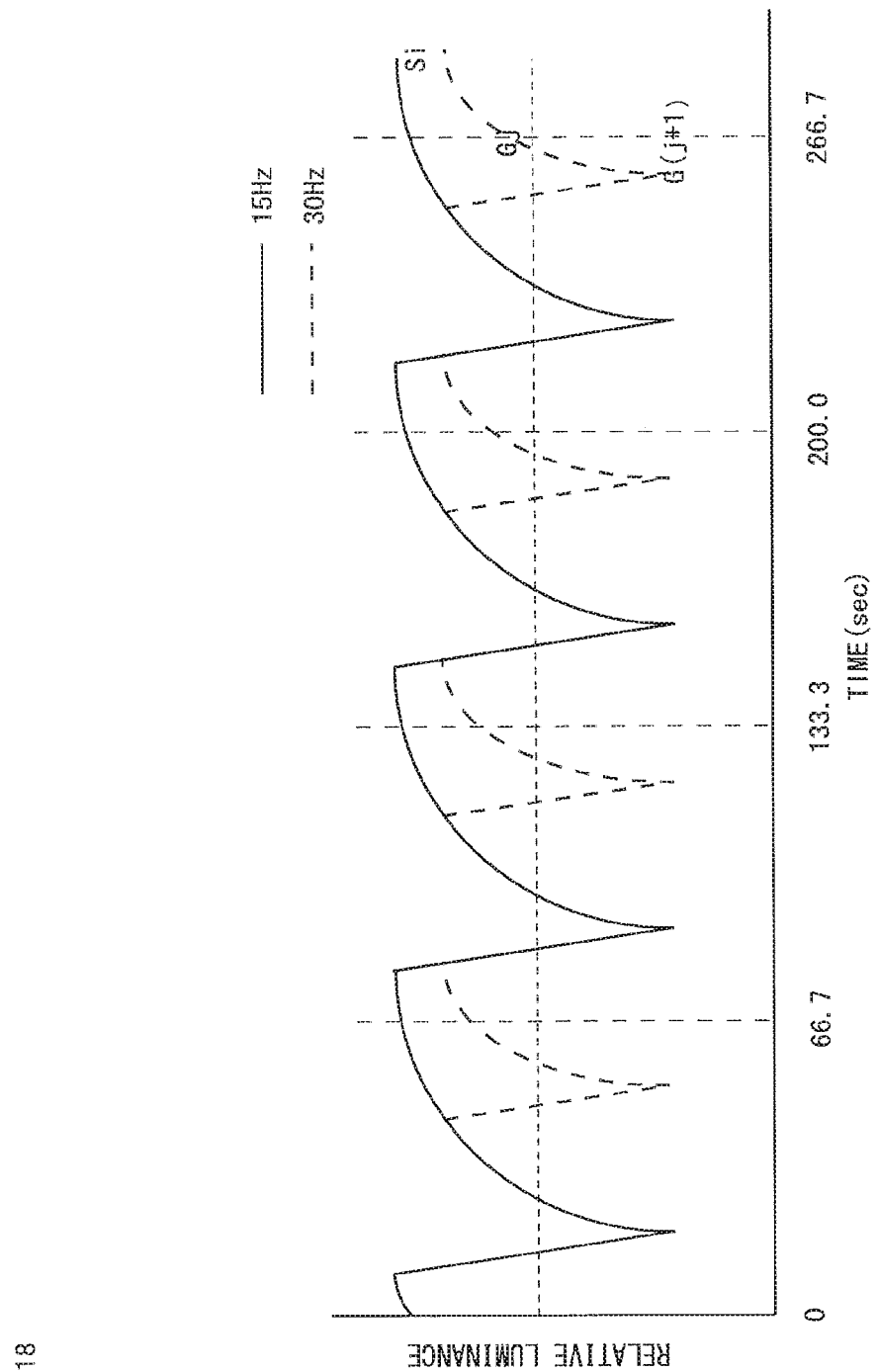
FIG. 18 is a chart representing luminance waveforms during the pause period in the liquid crystal display device shown in FIG. 5 where the drive frequency is 15 Hz or 30 Hz.

Next, the relationship between luminance change and drive frequency during the pause period will be described. FIG. 18 is a chart representing luminance waveforms during the pause period where the drive frequency is 15 Hz or 30 Hz. As shown in FIG. 18, the duration of the pause period with the 15-Hz drive frequency is twice as much as the duration of the pause period with the 30-Hz drive frequency.

The speed of luminance increase is determined by the balance in CR time constant between the liquid crystal material and the alignment film, and therefore, the speed of luminance increase is the same for both the 15-Hz and 30-Hz drive frequencies. The amplitude of luminance increase becomes larger as the duration of the pause period increases. The duration of the pause period with the 15-Hz drive frequency is longer than with the 30-Hz drive frequency, and therefore, luminance increases correspondingly during the pause period with the 15-Hz drive frequency. Conceivably, such a difference in luminance increase during the pause period contributes to the flicker value where the value $\beta(A-B)$ is positive being smaller in FIG. 16 than in FIG. 10. Although the luminance change has been described herein as being affected simply by the balance in CR time constant, the luminance change is also affected by, for example, drive methods and display modes.

3.6 Structure of the Liquid Crystal Panel

Figure 19:
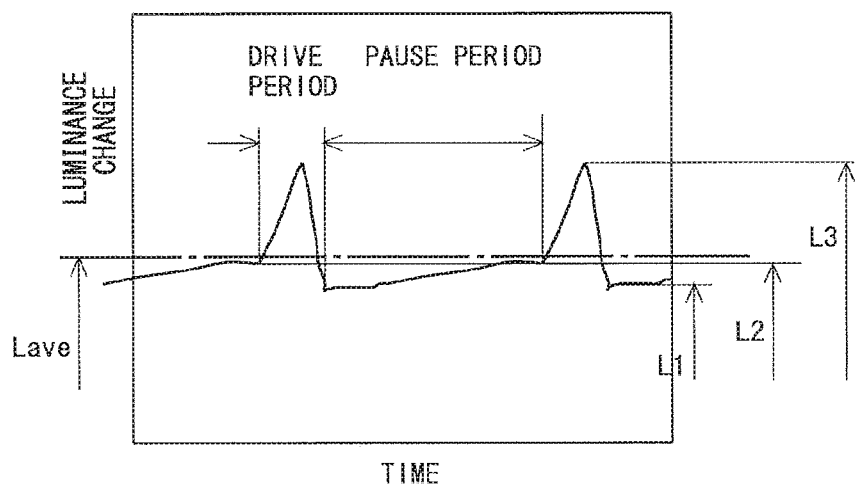
FIG. 19 is a diagram describing methods for calculating a luminance change rate during a drive period and a luminance change rate during the pause period of the liquid crystal display device shown in FIG. 5.

Described first is luminance change rate $\Delta L_{drive}$ during the drive period where data signal polarity is inverted, and also luminance change rate $\Delta L_{pause}$ during the pause period. FIG. 19 is a diagram describing methods for calculating the luminance change rates during the drive period and the pause period. Assuming that, as shown in FIG. 19, the lowest and highest luminances during the drive period are $L_2$ and $L_3$, respectively, the lowest and highest luminances during the pause period are $L_1$ and $L_2$, respectively, and the average luminance for the entirety of the drive period and the pause period, is $L_{ave}$, the luminance change rate $\Delta L_{drive}$ and the luminance change rate $\Delta L_{pause}$ are respectively represented by the following equations (7) and (8):

$$\Delta L_{drive}=(L_3-L_2)/L_{ave} \qquad (7)$$

$$\Delta L_{pause}=(L_2-L_1)/L_{ave} \qquad (8)$$

Figure 20:
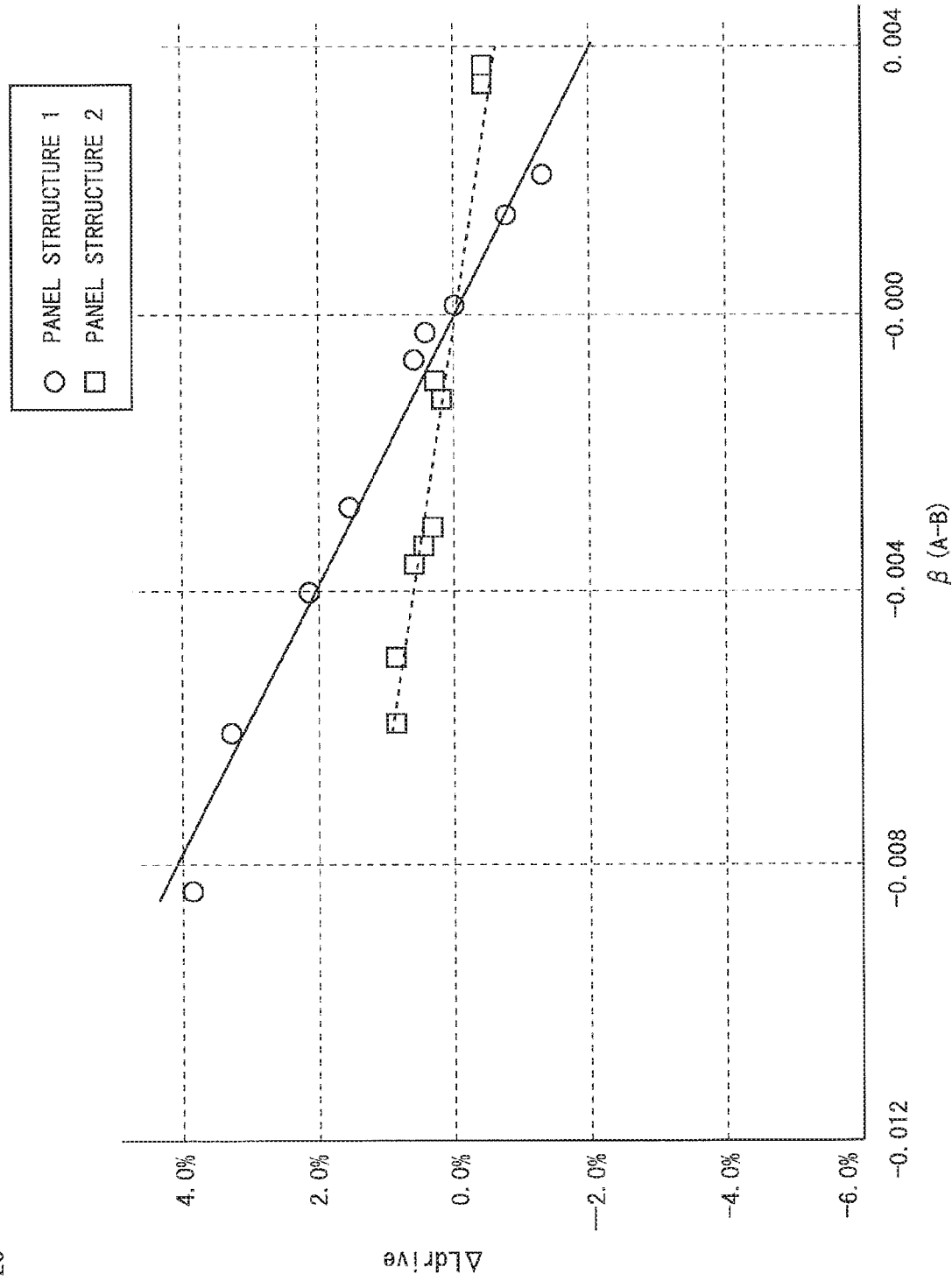
FIG. 20 is a graph showing the relationship between value β(A−B) and luminance change rate during the drive period of the liquid crystal display device shown in FIG. 5.

Described next is the relationship between value $\beta(A-B)$ and the luminance change rate $\Delta L_{drive}$. FIG. 20 is a graph showing the relationship between value $\beta(A-B)$ and the luminance change rate during the drive period. From FIG. 20, it can be appreciated that $\Delta L_{drive}$ is proportional to $\beta(A-B)$; $\Delta L_{drive}$ is represented by the following formula (9) where k denotes the proportionality constant:

$$\Delta L_{drive}=\beta(A-B)\times k \qquad (9)$$

Here, the proportionality constant k is a value unique to the structure of the liquid crystal panel and is conceived to be determined mainly by the positional relationship between the pixel electrode and the common electrode. Since luminance momentarily increases during the drive period when the value $\beta(A-B)$ is negative and momentarily decreases during the drive period when the value $\beta(A-B)$ is positive, the proportionality constant k is always negative.

In this manner, the luminance change rate $\Delta L_{drive}$ is proportional to the value $\beta(A-B)$, and the proportionality constant k is negative, with the result that in the case where the luminance change rate $\Delta L_{pause}$ is positive, when the luminance change rate $\Delta L_{drive}$ is negative, i.e., when the value $\beta(A-B)$ is positive, flicker can be reduced. Moreover, in the case where the luminance change rate $\Delta L_{pause}$ is negative, when the luminance change rate $\Delta L_{drive}$ is positive, i.e., when the value $\beta(A-B)$ is negative, flicker can be reduced.

Consider now structures 1 and 2 respectively for a liquid crystal panel using a lower-layer electrode made of ITO as a common electrode and another liquid crystal panel using an upper-layer electrode made of ITO as a common electrode. Proportionality constants k for structures 1 and 2 are respectively represented by the following expressions (10) and (11):

Structure 1: $k \approx -5.5$ (10)

Structure 2: $k \approx -1.5$ (11)

Figure 21A:
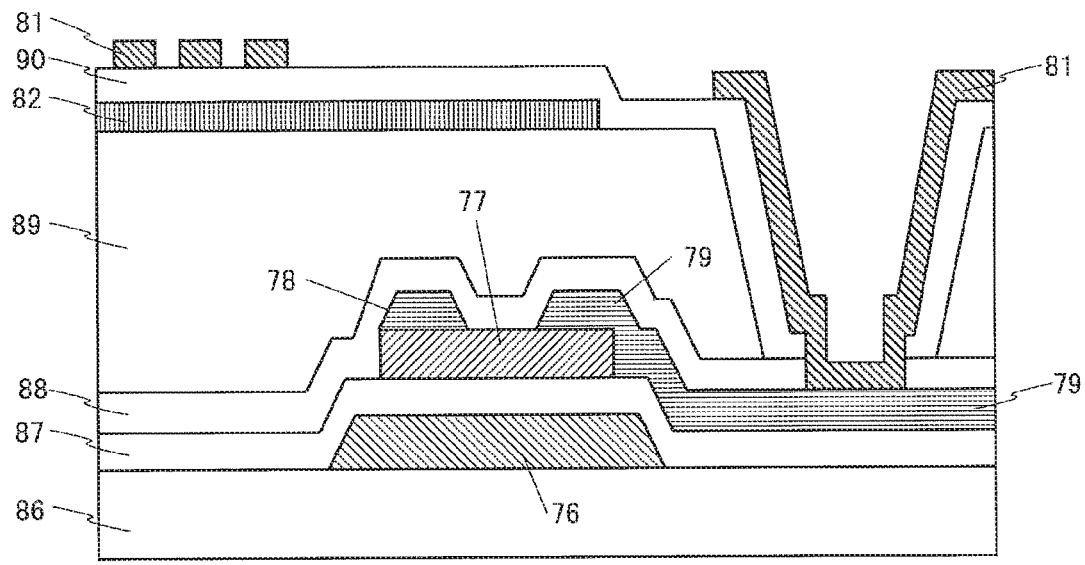
FIG. 21A is a cross sectional view of a pixel forming portion using a lower-layer electrode as a common electrode.
Figure 21B:
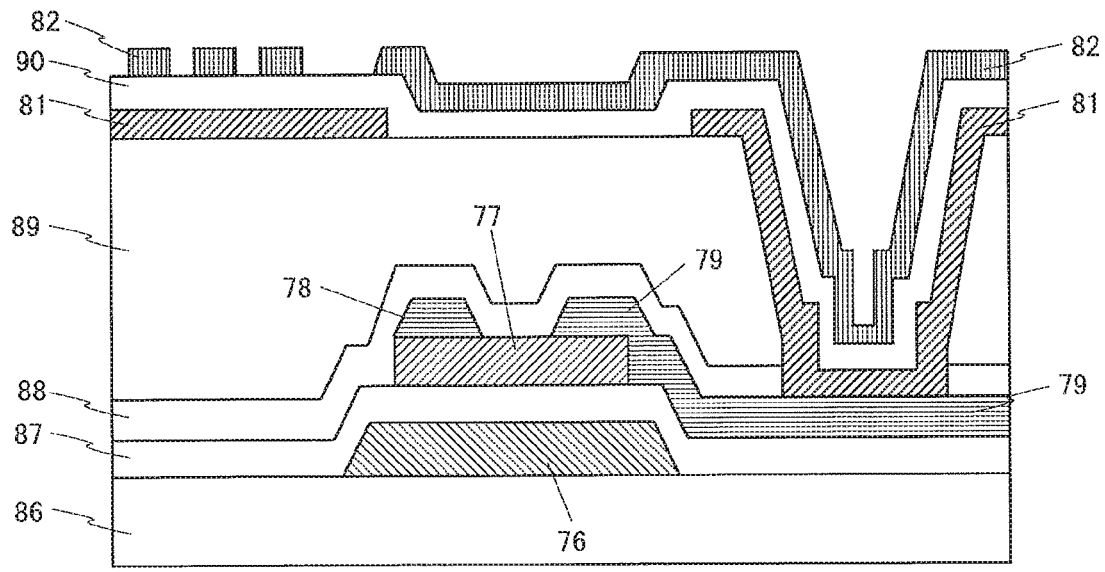
FIG. 21B is a cross sectional view of a pixel forming portion using an upper-layer electrode as a common electrode.

FIG. 21A is a cross sectional view of a pixel forming portion using a lower-layer electrode as a common electrode. FIG. 21B is a cross sectional view of a pixel forming portion using an upper-layer electrode as a common electrode. In the pixel forming portion using the lower-layer electrode as the common electrode 82, as shown in FIG. 21A, a TFT is formed on an insulating substrate 86. The TFT includes a gate electrode 76, a gate insulating film 87, a semiconductor layer 77, a source electrode 78, and a drain electrode 79. The gate electrode 76 is formed on the insulating substrate 86. The gate insulating film 87 is formed so as to cover the gate electrode 76. The semiconductor layer 77 is formed on the gate insulating film 87 and includes source and drain regions. The source electrode 78 is connected to the source region. The drain electrode 79 is connected to the drain region. Moreover, the TFT is covered by insulating films 88 and 89. The common electrode 82 made of ITO is formed on the insulating film 89. Further, formed on the common electrode 82 is an insulating film 90 on which a pixel electrode 81 is formed such that the pixel electrode 81 and the common electrode 82 are positioned on opposite surfaces of the insulating film 90. The insulating films 88 and 89 are provided with a contact hole reaching to the drain electrode 79, with the result that the drain electrode 79 is electrically connected to the pixel electrode 81 within the contact hole.

Furthermore, in the pixel forming portion using the upper-layer electrode as the common electrode, as shown in FIG. 21B, a TFT is formed on an insulating substrate 86. The TFT includes a gate electrode 76, a gate insulating film 87, a semiconductor layer 77, a source electrode 78, and a drain electrode 79. The gate electrode 76 is formed on the insulating substrate 86. The gate insulating film 87 is formed so as to cover the gate electrode 76. The semiconductor layer 77 is formed on the gate insulating film 87 and includes source and drain regions. The source electrode 78 is connected to the source region. The drain electrode 79 is connected to the drain region. Moreover, the TFT is covered by insulating films 88 and 89. Formed on the insulating film 89 is a pixel electrode 81. Further, formed on the pixel electrode 81 is an insulating film 90 on which the common electrode 82 made of ITO is formed such that the pixel electrode 81 and the common electrode 82 are positioned on opposite surfaces of the insulating film 90. The insulating films 88 and 89 are provided with a contact hole reaching to the drain electrode 79, with the result that the drain electrode 79 is electrically connected to the pixel electrode 81 within the contact hole.

3.7 Relationship Between Luminance Change Rates and Flicker Value

Figure 22:
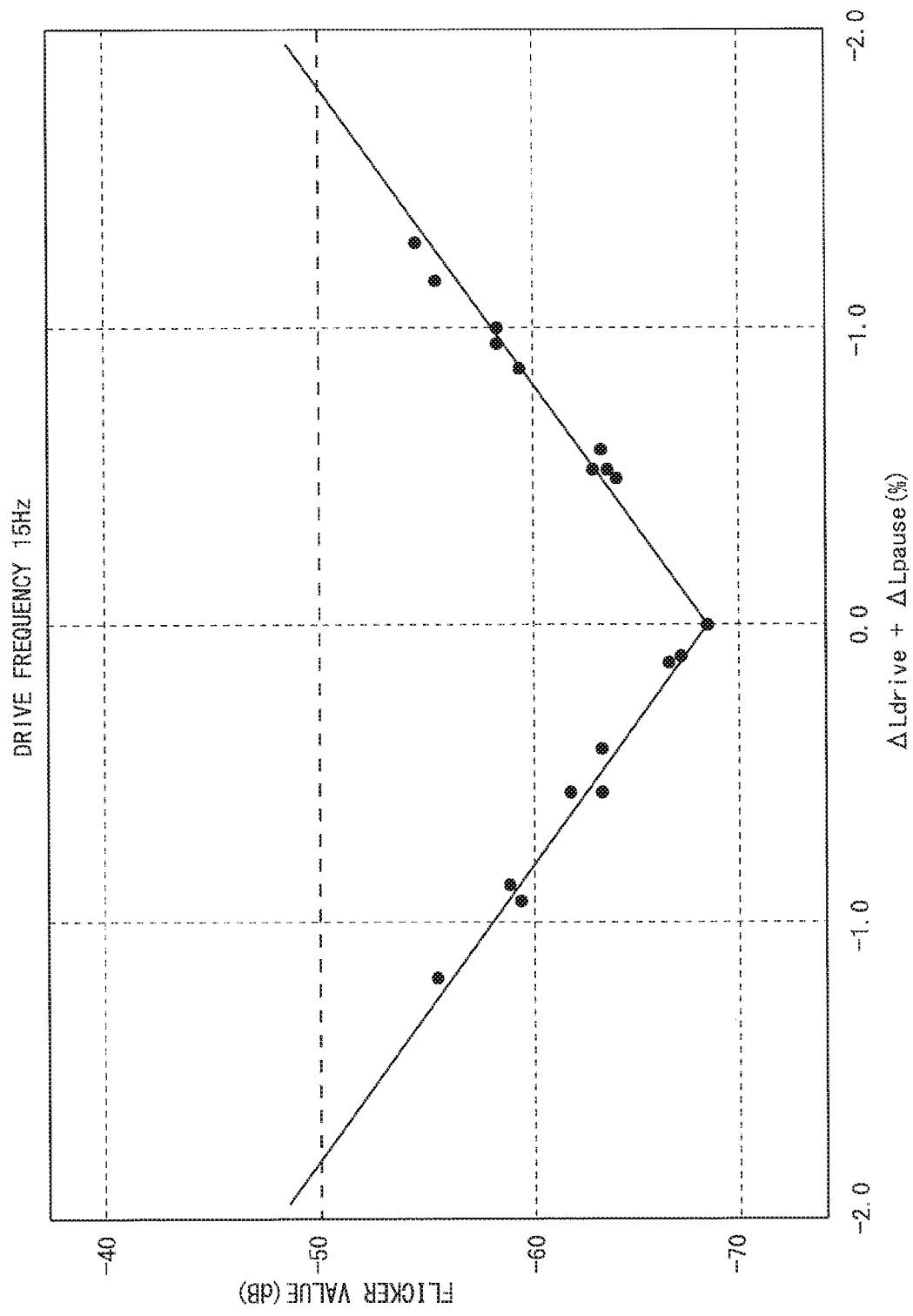
FIG. 22 is a graph showing the relationship between flicker value and the sum of luminance change rates during the drive period and the pause period in the liquid crystal display device shown in FIG. 5 where the drive frequency is 15 Hz.

FIG. 22 is a graph showing the relationship between flicker value and the sum of luminance change rates during the drive period and the pause period where the drive frequency is 15 Hz. It is said that when humans visually perceive flicker, the flicker value is generally −50 to −55 dB. Accordingly, from FIG. 22, it can be appreciated that to reduce the flicker value to −50 dB where the drive frequency is 15 Hz, the luminance change rate $\Delta L_{drive}$ during the drive period and the luminance change rate $\Delta L_{pause}$ during the pause period are required to satisfy the following relation (12):

$$-1.8\% \leq \Delta L_{drive} + \Delta L_{pause} \leq 1.8\% \quad (12)$$

By substituting $\Delta L_{drive} \approx \beta(A-B) \times k$ into relation (12), the following relation (13) can be obtained:

$$(-1.8\% + \Delta L_{pause})/k \leq \beta(A-B) \leq (-1.8\% - \Delta L_{pause})/k \quad (13)$$

In the case of the liquid crystal panel with structure 1, $k \approx -1.5$, and where $\Delta L_{pause} = +0.3\%$, the range of $\beta(A-B)$ is represented by the following relation (14):

$$-0.01 \leq \beta(A-B) \leq 0.014 \quad (14)$$

Furthermore, from FIG. 22, it can be appreciated that the flicker value is minimized where $\Delta L_{drive} + \Delta L_{pause} \approx 0$, i.e., $\Delta L_{drive} = \Delta L_{pause} = 0$. On the other hand, from equation (5), $\Delta L_{drive} \approx \beta(A-B) \times k$, and therefore, the flicker value is minimized when $\Delta L_{pause}$ takes a value obtained by the following expression (15):

$$\Delta L_{pause} \approx -\beta(A-B) \times k \quad (15)$$

The case where the drive frequency is 15 Hz has been described above. Flicker is most perceived where the drive frequency is around 10 to 15 Hz, as can be appreciated from the frequency response of the integrator shown in FIG. 3 that takes human visual characteristics into consideration. Accordingly, by satisfying conditions where the drive frequency is 15 Hz, such conditions for other frequencies can conceivably be satisfied as well. Thus, to reduce flicker so as not to be perceived, the value $\beta(A-B)$ is simply required to be set within the range defined by relation (13).

3.8 Effects of the Present Embodiment

In the case of the display device in which pause drive is performed, when the time constant $C_{pi}R_{pi}$ of the alignment film is higher than the time constant $C_{lc}R_{lc}$ of the liquid crystal material, luminance decreases during the pause period, as represented by a declining waveform. Therefore, to set the value $\beta(A-B)$ to be positive for each pixel, the primary parasitic capacitance $C_{sd(A)}$ of the pixel is rendered higher than the secondary parasitic capacitance $C_{sd(B)}$ thereof. As a result, luminance momentarily decreases during the drive period, thereby canceling out a luminance increase during the pause period.

On the other hand, when the time constant $C_{pi}R_{pi}$ of the alignment film is lower than the time constant $C_{lc}R_{lc}$ of the liquid crystal material, luminance increases during the pause period, as represented by a rising waveform. Therefore, to set the value $\beta(A-B)$ to be negative for each pixel, the primary parasitic capacitance $C_{sd(A)}$ of the pixel is rendered lower than the secondary parasitic capacitance $C_{sd(B)}$ thereof. As a result, luminance momentarily increases during the drive period, thereby canceling out a luminance decrease during the pause period.

In this manner, when the liquid crystal material and the alignment film that are used are not matched in terms of time constant, the primary parasitic capacitance $C_{sd(A)}$ and the secondary parasitic capacitance $C_{sd(B)}$ are adjusted so as to set the value $\beta(A-B)$ to be positive or negative, thereby cancelling out a luminance change during the pause period, with the result that the flicker value is reduced and flicker is mitigated. Flicker tends to be worsened particularly during low-frequency drive, and therefore, the method for adjusting the value β(A−B) according to the present embodiment is very effective in suppressing flicker.

The luminance change rate and the value β(A−B) are proportional during the drive period, and the proportionality constant k is determined mainly by the arrangement of the pixel electrode and the common electrode by which pixel capacitance is formed. Therefore, in the case where the luminance change rate $\Delta L_{pause}$ during the pause period is positive, the value β(A−B) is set to be positive, so that the luminance change rate $\Delta L_{drive}$ during the drive period becomes negative, thereby cancelling out a luminance increase during the pause period, with the result that flicker is mitigated during low-frequency drive. Therefore, the pixel forming portion is designed such that the primary parasitic capacitance $C_{sd(A)}$ is higher than the secondary parasitic capacitance $C_{sd(B)}$.

Furthermore, in the case where the luminance change rate $\Delta L_{pause}$ is negative, the value β(A−B) is set to be negative, so that the luminance change rate $\Delta L_{drive}$ becomes positive, thereby cancelling out a luminance decrease during the pause period. Therefore, the pixel forming portion is designed such that the primary parasitic capacitance $C_{sd(A)}$ is lower than the secondary parasitic capacitance $C_{sd(B)}$.

In this manner, the primary parasitic capacitance $C_{sd(A)}$ and the secondary parasitic capacitance $C_{sd(B)}$ are adjusted, thereby cancelling out a luminance change during the pause period by a luminance change during the drive period, with the result that the flicker value can be reduced and flicker can be mitigated.

While the invention has been described in detail, the foregoing description is in all aspects illustrative and not restrictive. It is understood that numerous other modifications and variations can be devised without departing from the scope of the invention.

What is claimed is:

1. A liquid crystal display device performing pause drive by alternating between a drive period and a pause period with predetermined frequency, the drive period being a period during which an image is displayed based on externally inputted image data, the pause period being a period during which the image is displayed based on the image data written during the drive period, the device comprising:
a display portion including a plurality of pixel forming portions;
a drive portion configured to drive the pixel forming portions; and
a display control portion configured to control the drive portion based on the externally inputted image data, wherein,
the pixel forming portion includes a liquid crystal material and alignment films between which the liquid crystal material is situated, the alignment films controlling orientation of liquid crystal molecules in the liquid crystal material, and
the display control portion cancels out a luminance change in the image displayed by the pixel forming portions during the pause period, by changing luminance of the image during the drive period.

2. The display device according to claim 1, wherein the luminance change in the image during the pause period is determined by a magnitude relationship between the liquid crystal material and the alignment film in terms of time constant.

3. The display device according to claim 2, wherein, the luminance change during the drive period is determined by value β(A−B), as represented by the following equation (A):

$$\beta(A-B)=\{C_{sd(A)}-C_{sd(B)}\}/C_{pi} \qquad (A)$$

where $C_{pi}$ denotes a liquid crystal capacitance formed by a pixel electrode and a common electrode, $C_{sd(A)}$ denotes a primary parasitic capacitance formed by a data signal line for a pixel and a drain electrode of the pixel, and $C_{sd(B)}$ denotes a secondary parasitic capacitance formed by the drain electrode and another data signal line for an adjacent pixel, and
the luminance during the drive period momentarily decreases when the value β(A−B) is positive and momentarily increases when the value β(A−B) is negative.

4. The display device according to claim 3, wherein, when the alignment film has a lower time constant than the liquid crystal material, the luminance during the pause period increases.

5. The display device according to claim 4, wherein, when the luminance during the pause period increases, the primary parasitic capacitance $C_{sd(A)}$ is rendered higher than the secondary parasitic capacitance $C_{sd(B)}$ in order to set the value β(A−B) to be positive.

6. The display device according to claim 4, wherein,
a luminance change rate during the drive period is represented by multiplying the value β(A−B) by a negative constant, and
the constant varies from one structure to another of the pixel forming portion.

7. The display device according to claim 4, wherein a sum of the luminance change rate during the drive period and a luminance change rate during the pause period falls within a range satisfying the following relation (B):

$$-1.8\% \leq \Delta L_{drive} \leq \Delta L_{pause}+1.8\% \qquad (B),$$

where $\Delta L_{drive}$ denotes the luminance change rate during the drive period, and $\Delta L_{pause}$ denotes the luminance change rate during the pause period.

8. The display device according to claim 7, wherein flicker value is minimized when the value β(A−B) is represented by the following equation (C):

$$\beta(A-B)=-\Delta L_{pause}/k \qquad (C).$$

9. The display device according to claim 3, wherein, when the alignment film has a higher time constant than the liquid crystal material, the luminance during the pause period decreases.

10. The display device according to claim 9, wherein, when the luminance during the pause period decreases, the primary parasitic capacitance $C_{sd(A)}$ is rendered lower than the secondary parasitic capacitance $C_{sd(B)}$ in order to set the value β(A−B) to be negative.

* * * * *